(12) United States Patent
Uryu

(10) Patent No.: US 8,596,408 B2
(45) Date of Patent: Dec. 3, 2013

(54) TORQUE SENSOR, TORQUE DETECTOR, AND ELECTRIC POWER STEERING DEVICE

(75) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 13/323,114

(22) Filed: Dec. 12, 2011

(65) Prior Publication Data

US 2012/0152647 A1  Jun. 21, 2012

(30) Foreign Application Priority Data

Dec. 21, 2010  (JP) ................................ 2010-284328

(51) Int. Cl.
*B62D 5/04* (2006.01)
*G01L 3/10* (2006.01)

(52) U.S. Cl.
USPC ......................................................... 180/446

(58) Field of Classification Search
None
See application file for complete search history.

(56) References Cited

U.S. PATENT DOCUMENTS

| | | | | |
|---|---|---|---|---|
| 6,328,128 B1 * | 12/2001 | Chikaraishi | ................... | 180/446 |
| 6,892,120 B2 * | 5/2005 | Kanda | ............................ | 701/41 |
| 6,913,109 B2 * | 7/2005 | Kodama et al. | ............... | 180/446 |
| 7,290,638 B2 * | 11/2007 | Shiino et al. | .................. | 180/444 |
| 2005/0171667 A1 * | 8/2005 | Morita | ............................ | 701/43 |
| 2005/0205343 A1 * | 9/2005 | Uryu | ............................. | 180/446 |
| 2010/0299027 A1 * | 11/2010 | Aoki | ............................... | 701/42 |

FOREIGN PATENT DOCUMENTS

JP  11-78924  3/1999

* cited by examiner

*Primary Examiner* — Tony Winner

(74) *Attorney, Agent, or Firm* — Harness, Dickey & Pierce, PLC

(57) ABSTRACT

An electric power steering device includes a torque detector that includes a torque sensor and a control unit. When abnormality has not occurred in a torque signal, an output section in the torque sensor transmits a normal signal that is a value based on the torque signal and is between a second lower limit that is greater than a first lower limit and a second upper limit that is less than a first upper limit. When abnormality has occurred in the torque signal, the output section transmits a first fault notification signal that is a value between the first and second lower limits or a second fault notification signal that is a value between the first and second upper limits. The control unit identifies a fault and calculates an amount of assist for reducing steering torque based on a signal transmitted from the output section.

24 Claims, 29 Drawing Sheets

FIG. 12

| Flag1 | 1 | 0 | 1 | 1 | 0 | 0 | 1 | 0 |
|---|---|---|---|---|---|---|---|---|
| Flag2 | 0 | 1 | 1 | 0 | 1 | 0 | 1 | 0 |
| Flag3 | 1 | 1 | 0 | 0 | 0 | 1 | 1 | 0 |
| DETERMINATION RESULT | TRQ11 ABNORMAL | TRQ21 ABNORMAL | TRQF ABNORMAL | TEMPORARILY NORMAL 1 | TEMPORARILY NORMAL 2 | TEMPORARILY NORMAL 3 | ALL ABNORMAL | NORMAL |
| TRQ13 | 4.3V | TRQ12 | TRQ12 | TRQ12 | TRQ12 | TRQ12 | 0.7V | TRQ12 |
| TRQ23 | TRQ22 | 4.3V | 0.7V | TRQ22 | TRQ22 | TRQ22 | 0.7V | TRQ22 |

FIG. 13A

| Flag1 | 1 | 0 | 1 | 1 | 0 |
|---|---|---|---|---|---|
| Flag2 | 0 | 1 | 0 | 1 | 0 |
| Flag3 | 1 | 1 | 1 | 0 | 0 |
| DETERMINATION RESULT | TRQ11 ABNORMAL | TRQ21 ABNORMAL | TRQ11 ABNORMAL | TRQF ABNORMAL | NORMAL |
| TRQ13 | 4.3V | TRQ12 | 4.3V | TRQ12 | TRQ12 |
| TRQ23 | TRQ22 | 0.7V | TRQ12 | 0.7V | TRQ22 |

FIG. 13B

| Flag1 | 1 | 0 | 1 | 1 | 0 |
|---|---|---|---|---|---|
| Flag2 | 0 | 1 | 0 | 1 | 0 |
| Flag3 | 1 | 1 | 1 | 0 | 0 |
| DETERMINATION RESULT | TRQ11 ABNORMAL | TRQ21 ABNORMAL | TRQ11 ABNORMAL | TRQF ABNORMAL | NORMAL |
| TRQ13 | 4.3V | TRQ12 | TRQ12 | 0.7V | TRQ12 |
| TRQ23 | TRQ22 | 4.3V | ABNORMAL | TRQ22 | TRQ22 |

FIG. 13C

| Flag1 | 1 | 0 | 1 | 1 | 0 |
|---|---|---|---|---|---|
| Flag2 | 0 | 1 | 0 | 1 | 0 |
| Flag3 | 1 | 1 | 1 | 0 | 0 |
| DETERMINATION RESULT | TRQ11 ABNORMAL | TRQ21 ABNORMAL | TRQ11 ABNORMAL | TRQF ABNORMAL | NORMAL |
| TRQ13 | 0.7V | TRQ12 | TRQ12 | 4.3V | TRQ12 |
| TRQ23 | TRQ22 | 0.7V | ABNORMAL | TRQ22 | TRQ22 |

FIG. 13D

| Flag1 | 1 | 0 | 1 | 1 | 0 |
|---|---|---|---|---|---|
| Flag2 | 0 | 1 | 0 | 1 | 0 |
| Flag3 | 1 | 1 | 1 | 0 | 0 |
| DETERMINATION RESULT | TRQ11 ABNORMAL | TRQ21 ABNORMAL | TRQ11 ABNORMAL | TRQF ABNORMAL | NORMAL |
| TRQ13 | 0.7V | TRQ12 | TRQ12 | 4.3V | TRQ12 |
| TRQ23 | TRQ22 | 0.7V | ABNORMAL | TRQ22 | TRQ22 |

FIG. 22A

| Flag1 | 1 | 0 | 0 |
|---|---|---|---|
| Flag2 | 0 | 1 | 0 |
| DETERMINATION RESULT | TRQ11 ABNORMAL | TRQ21 ABNORMAL | NORMAL |
| TRQ13 | 4.3V | TRQ12 | TRQ12 |
| TRQ23 | TRQ22 | 4.3V | TRQ22 |

FIG. 22B

| Flag1 | 1 | 0 | 0 |
|---|---|---|---|
| Flag2 | 0 | 1 | 0 |
| DETERMINATION RESULT | TRQ11 ABNORMAL | TRQ21 ABNORMAL | NORMAL |
| TRQ13 | 0.7V | TRQ12 | TRQ12 |
| TRQ23 | TRQ22 | 0.7V | TRQ22 |

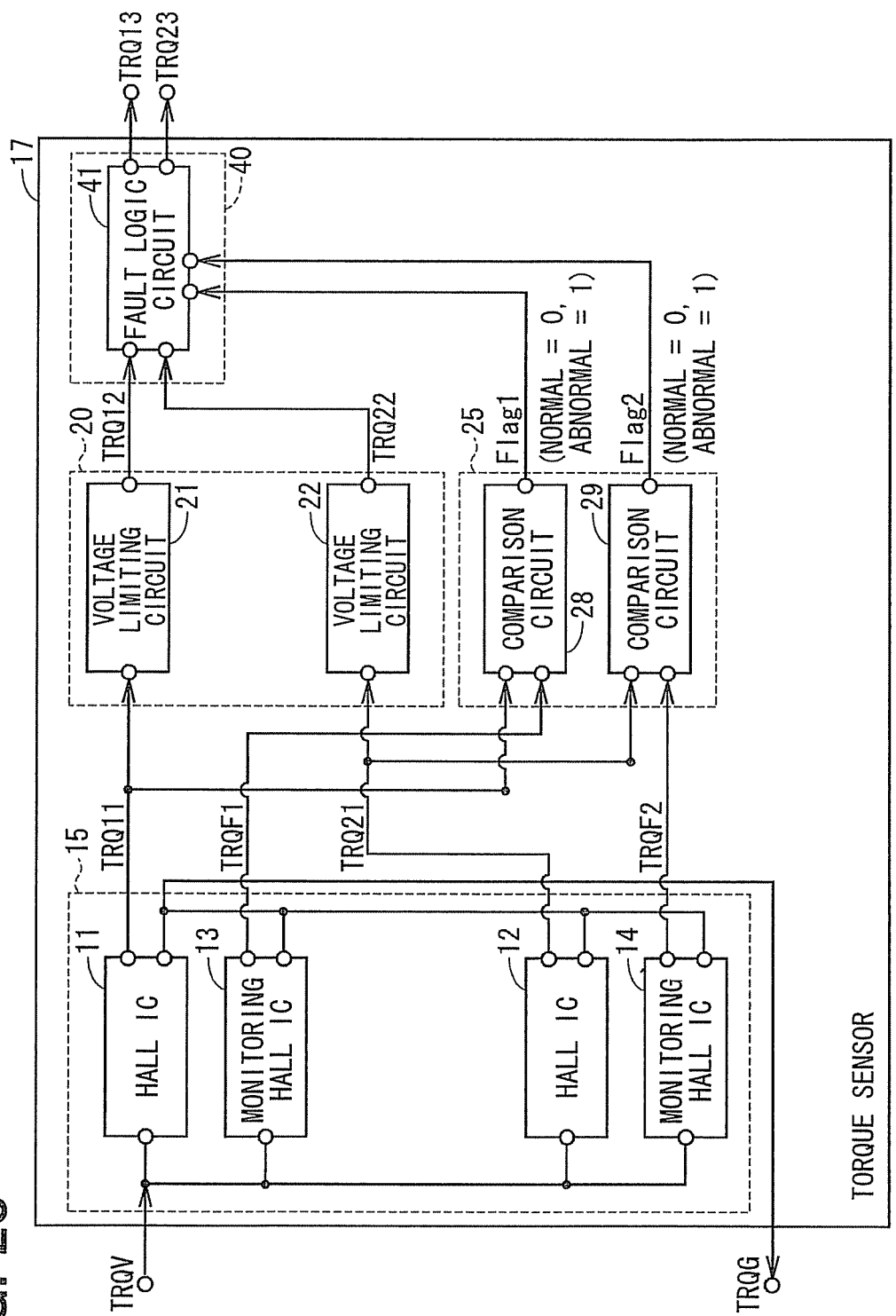

FIG. 27

| Flag1 | 1 | 0 | 0 | 1 | 0 | 0 | 1 | 0 |
|---|---|---|---|---|---|---|---|---|
| Flag2 | 0 | 1 | 0 | 0 | 1 | 1 | 1 | 0 |
| Flag4 | 0 | 0 | 1 | 1 | 0 | 1 | 1 | 0 |
| DETERMINATION RESULT | TRQ11 ABNORMAL | TRQ21 ABNORMAL | TRQF1 ABNORMAL | TRQF2 ABNORMAL | TEMPORARILY NORMAL | TEMPORARILY ABNORMAL | ALL ABNORMAL | NORMAL |
| TRQ13 | 4.3V | TRQ12 | 0.7V | TRQ12 | TRQ12 | 0.7V | 0.7V | TRQ12 |
| TRQ23 | TRQ22 | 4.3V | TRQ22 | 0.7V | TRQ22 | 0.7V | 0.7V | TRQ22 |

FIG. 28A

| Flag1 | 1 | 0 | 1 | 0 | 0 |
|---|---|---|---|---|---|
| Flag2 | 0 | 1 | 0 | 1 | 0 |
| Flag4 | 0 | 0 | 1 | 1 | 0 |
| DETERMINATION RESULT | TRQ11 ABNORMAL | TRQ21 ABNORMAL | TRQF1 ABNORMAL | TRQF2 ABNORMAL | NORMAL |
| TRQ13 | 4.3V | TRQ12 | 0.7V | TRQ12 | TRQ12 |
| TRQ23 | TRQ22 | 4.3V | TRQ22 | 0.7V | TRQ22 |

FIG. 28B

| Flag1 | 1 | 0 | 1 | 0 | 0 |
|---|---|---|---|---|---|
| Flag2 | 0 | 1 | 0 | 1 | 0 |
| Flag4 | 0 | 0 | 1 | 1 | 0 |
| DETERMINATION RESULT | TRQ11 ABNORMAL | TRQ21 ABNORMAL | TRQF1 ABNORMAL | TRQF2 ABNORMAL | NORMAL |
| TRQ13 | 0.7V | TRQ12 | 4.3V | TRQ12 | TRQ12 |
| TRQ23 | TRQ22 | 0.7V | TRQ22 | 4.3V | TRQ22 |

TORQUE SENSOR, TORQUE DETECTOR, AND ELECTRIC POWER STEERING DEVICE

CROSS REFERENCE TO RELATED APPLICATIONS

The present application is based on and claims priority to Japanese Patent Application No. 2010-284328 filed on Dec. 21, 2010, the disclosure of which is incorporated herein by reference.

TECHNICAL FIELD

The present invention relates to a torque sensor, a torque detector, and an electric power steering device.

BACKGROUND

Conventionally, a torque sensor for sensing steering torque generated when a driver and the like steers a steering component and an electric power steering device for calculating an amount of assist in response to steering torque sensed by the torque sensor to reduce the steering torque by the driver are well known. It is known that, when a torque sensor is applied to an electric power steering device, two torque detection sections are provided to improve safety and abnormality is detected based on the torque signals transmitted from the two torque detection sections. For example, in Japanese Patent No. 3,917,725, two steering torque detection sections which include a steering torque sensor and a steering torque detector having a torque signal detector and fault detection section are provided. In addition, a switching section is provided. When one steering torque detection section determines a self fault, the switching section switches the one steering torque detection section to the other steering torque detection section.

In Japanese Patent No. 3,917,725, a power supply line and a ground line may be required between the torque sensor and the control section in addition to a total of four lines: two signal lines from a torque signal detector; and two signal lines from fault detection section. Thus, it may be necessary to provide at least six lines. That is, in Japanese Patent No. 3,917,725, the signal lines are greater in number by the number of the signal lines from the fault detection section in comparison with the case where a total of four wires: two signal lines from a torque signal detector; a power supply line; and a ground line, are provided between a torque sensor and control section. Therefore, it may be necessary to use large-sized connectors and terminals inside the control section increase in number, which causes the overall system to be larger.

SUMMARY

In view of the foregoing problems, it is an object of the present invention to provide a torque sensor that can determine abnormality of torque signals appropriately. Other objects of the present invention are to provide a torque detector and to provide an electric power steering device.

A torque sensor according to a first aspect of the present invention includes a plurality of torque signal detection sections, a monitoring signal detection section, a limiting section, an abnormality determination section', and an output section. The torque signal detection sections detect a torque signal that depends on a torque and has a value between a first lower limit and a first upper limit. The monitoring signal detection section detects a monitoring signal that is a signal for determining abnormality of the torque signal and has a value between the first lower limit and the first upper limit. The limiting section changes the torque signal to a second lower limit when the torque signal is equal to or less than the second lower limit that is greater than the first lower limit. The limiting section changes the torque signal to a second upper limit when the torque signal is equal to or greater than the second upper limit that is less than the first upper limit. The abnormality determination section determines whether abnormality has occurred in the torque signal based on the torque signal and the monitoring signal. The output section transmits an output signal corresponding to the torque signal of each of the torque signal detection sections. When abnormality has not occurred in the torque signal, the output section transmits, as the output signal, a normal signal that is a value based on the torque signal and is between the second lower limit and the second upper limit. When abnormality has occurred in the torque signal, the output section transmits, as the output signal, a first fault notification signal that is a value between the first lower limit and the second lower limit or a second fault notification signal that is a value between the first upper limit and the second upper limit.

The torque sensor according to the first aspect can determine abnormality of torque signals appropriately. In addition, because the normal signal, the first fault notification signal, or the second fault notification signal is transmitted as the output signal corresponding to the torque signal detection section, additional configuration, such as a signal line, for detecting abnormality of the torque signals is not required.

A torque detector according to a second aspect of the present invention includes the torque sensor according to the first aspect, a control unit, a signal line, a power supply line, and a ground line. The control unit includes a signal acquisition section, a fault identification section, and a power circuit. The signal acquisition section acquires the output signal transmitted from the output section. The fault identification section identifies a fault based on the signal acquired by the signal acquisition section. The power circuit section supplies electric power to the torque sensor. The signal line is coupled between the output section and the control unit and transmits the output signal from the output section to the control unit. The power supply line is coupled between the control unit and the torque sensor. The ground line is coupled between the control unit and the torque sensor.

An electric power steering device according to a third aspect of the present invention includes the torque detector according to the second aspect. The control unit further includes a calculation section that calculates an amount of assist for reducing steering torque based on the signal acquired by the output signal acquisition section.

BRIEF DESCRIPTION OF THE DRAWINGS

Additional objects and advantages of the present disclosure will be greater readily apparent from the following detailed description when taken together with the accompanying drawings. In the drawings:

FIG. 12 is a diagram showing the output signals transmitted from the torque sensor according to the first embodiment of the present disclosure;

FIGS. 13A, 13B, 13C, and 13D are diagrams showing the output signals transmitted from the torque sensor according to the first embodiment of the present disclosure;

FIGS. 22A, 22B are diagrams showing output signals transmitted from the torque sensor according to the third embodiment of the present disclosure;

FIG. 23 is a block diagram showing a torque sensor according to a fourth embodiment of the present disclosure;

FIG. 27 is a diagram showing the output signals transmitted from the torque sensor according to the fifth embodiment of the present disclosure;

FIGS. 28A, 28B are diagrams showing the output signals transmitted from the torque sensor according to the fifth embodiment of the present disclosure;

DETAILED DESCRIPTION

Hereafter, a torque sensor, a torque detector, and an electric power steering device according to the present disclosure are explained in reference to the drawings. In the following multiple embodiments, the substantially similar components are represented by the similar reference signs and explanations of the substantially similar components are not repeated.

First Embodiment

Figure 1:
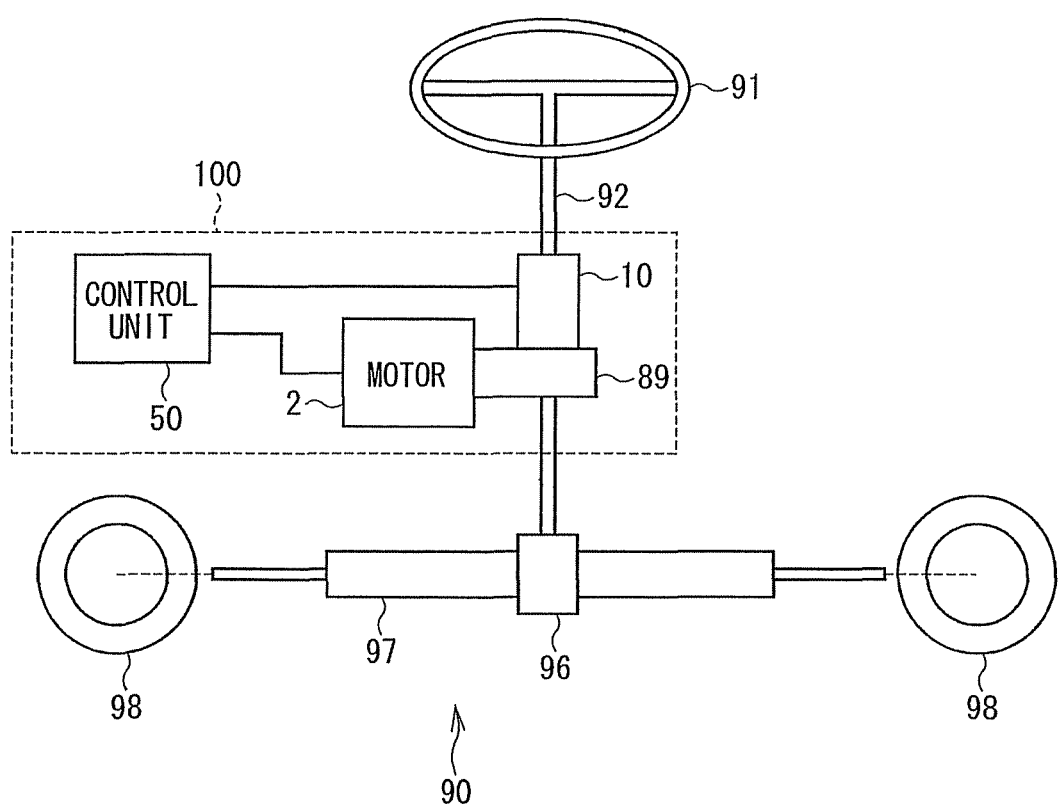
FIG. 1 is a diagram showing a steering system according to a first embodiment of the present disclosure.
Figure 2:
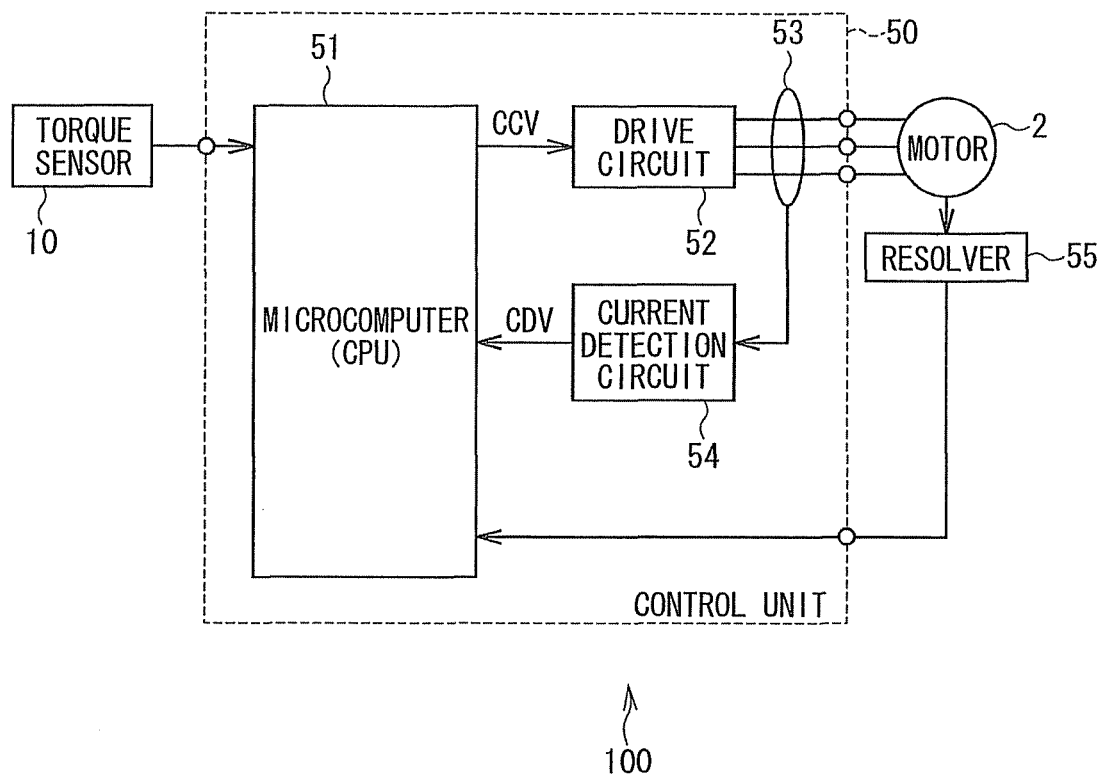
FIG. 2 is a block diagram showing an electric power steering device according to the first embodiment of the present disclosure.

An electric power steering device according to a first embodiment of the present disclosure is shown in FIGS. 1 and 2. An electric power steering device 100 is used for a steering system 90. The steering system 90 includes, e.g., a steering wheel 91, a steering shaft 92, a reducer 89, a pinion gear 96, a rack gear 97, and tires (wheels) 98. The pinion gear 96 that engages with the rack gear 97 is provided to the opposite top end of the steering shaft 92 to the steering wheel 91. A pair of the tires 98 is coupled to the ends of the rack gear 97 via tie rods and the like. Rotational movement of the steering shaft 92 is changed into linear movement by the pinion gear 96 and rack gear 97 to steer the right and left tires 98 in response to a linear movement displacement of the rack gear 97.

The electric power steering device 100 includes a motor 2 for generating assist torque to reduce steering torque for the steering of the steering wheel 91 by a driver, a torque control unit 50 for controlling the driving of the motor 2, and the reducers 89 that decelerates rotation of the motor 2 and transmits the rotation to the steering shaft 92. The motor 2 rotates the reducer 89 forward and reverse, and is a three phase brushless motor in the present embodiment, but may be any type of motor. As shown in FIG. 2, a resolver 55 for detecting a rotational angle of the motor 2 is provided to the motor 2. The electric power steering device 100 includes a torque sensor 10. The torque sensor 10 is provided to the steering shaft 92, detects a torque signal responsive to the steering torque generated when a driver steers the steering wheel 91, and transmits the torque signal to the control unit 50.

The control unit 50 includes, for example, a microcomputer (CPU) 51, a current detection circuit 52, and a drive circuit 54. Various calculations are performed by the microcomputer 51. In the current detection circuit 52, a sensor value is acquired from a current detection section 53, and a current detection value (CDV) is calculated. The microcomputer 51 performs feedback calculations based on, e.g., steering torque acquired by the torque sensor 10, a current detection value detected by the current detection circuit 52, and a rotational angle of the motor 2 detected by the resolver 55, and calculates a current command value (CCV) of the driving of the motor 2. Based on the calculated current command value, the driving of the motor 2 is controlled via the drive circuit 54.

Figure 3:
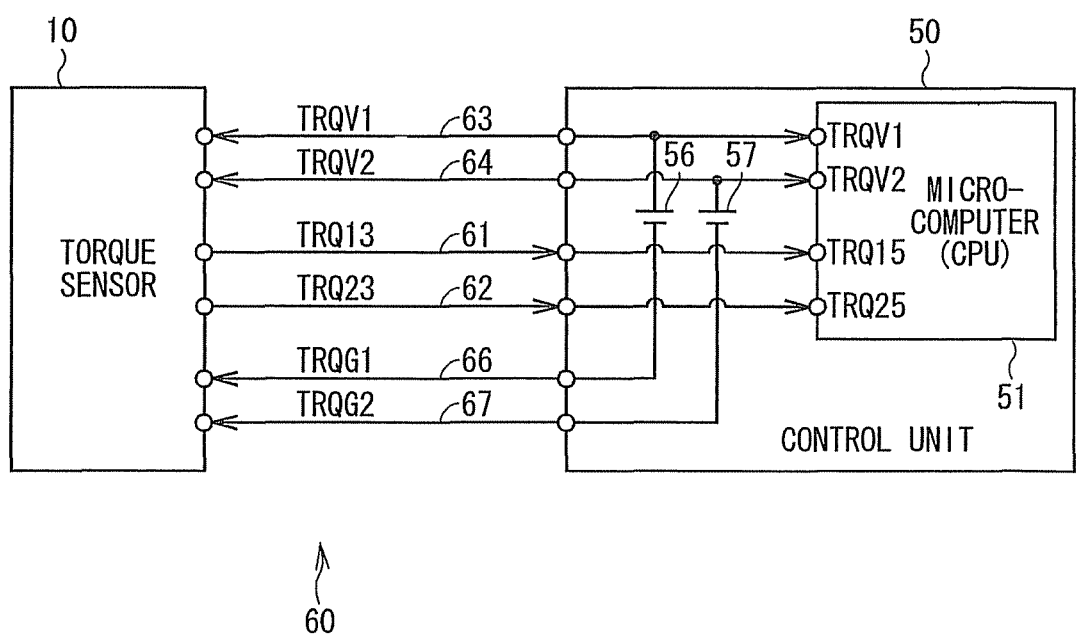
FIG. 3 is a block diagram showing a torque detector according to the first embodiment of the present disclosure.

In the present embodiment, as shown in FIG. 3, a torque detector 60 includes the torque sensor 10 and control unit 50. The control unit 50 has internal power sources 56 and 57. In the internal electrical power sources 56 and 57, voltage supplied from a battery (not shown) is regulated to a predetermined voltage by a regulator. In the present embodiment, the internal power sources 56 and 57 are regulated to 5 V. The torque sensor 10 is coupled to the internal power sources 56 and 57 by power supply lines 63 and 64 and ground lines 66 and 67. Thus, electric power is supplied to the torque sensor 10 from the internal power sources 56 and 57 of the control unit 50. An output signal based on the torque detected by the torque sensor 10 is transmitted to the control unit 50 via signal lines 61 and 62. The microcomputer 51 has AD converter terminals 511, 512, 513, and 514, and acquires signals from the signal lines 61 and 62 and the power supply lines 63 and 64.

The torque sensor 10 will be described with reference to FIG. 4. The torque sensor 10 includes a signal detection section 15, an limiting circuit section 20, a first abnormality determination section 25, a second abnormality determination section 30, and an output section 40. The signal detection section 15 has Hall ICs 11 and 12 as torque signal detection sections and a monitoring Hall IC 13 as a monitoring signal detection section. The Hall IC 11 is coupled to the power supply line 63 via a diode 571, and is coupled to the ground line 66 via a diode 575. Thus, electric power is supplied from the internal power source 56 to the Hall IC 11. The Hall IC 12 is coupled to the power supply line 64 via a diode 574, and coupled to the ground line 67 via a diode 578. Thus, electric power is supplied from the internal power source 57 to the Hall IC 12. The monitoring Hall IC 13 is coupled to the power supply lines 63 and 64 via diodes 572 and 573, and is coupled to the ground lines 66 and 67 via diodes 576 and 577. Thus, electric power is supplied from the internal power sources 56 and 57 to the monitoring Hall IC 13.

The Hall ICs 11 and 12 detect torque signals responsive to steering torque. The Hall IC 11 detects a change of magnetic flux generated by a deflection of a torsion bar (not shown) provided to the steering shaft 92, and detects a torque signal TRQ11 responsive to the change of this magnetic flux. The Hall IC 12 detects a change of the magnetic flux generated by a deflection of the torsion bar (not shown) provided to the steering shaft 92, and detects a torque signal TRQ21 responsive to the change of this magnetic flux. In the present embodiment, the Hall ICs 11 and 12 configured similarly, and when the Hall ICs 11 and 12 are both normal, the torque signal TRQ11 and torque signal TRQ21 are the same value.

The monitoring Hall IC 13 detects a monitoring signal to determine abnormality of the torque signal TRQ11 detected by the Hall IC 11 and of the torque signal TRQ21 detected by the Hall IC 12. The monitoring Hall IC 13 detects a change of the magnetic flux generated by a deflection of the torsion bar, and detects a monitoring signal TRQF responsive to the change of this magnetic flux. In the present embodiment, the monitoring Hall IC 13 is configured similarly to the Hall ICs 11 and 12, and when the Hall ICs 11 and 12 and the monitoring Hall IC 13 are normal, the torque signals TRQ11 and TRQ21 and the monitoring signal TRQF are the same value. The limiting circuit section 20 has voltage limiting circuits 21 and 22. The voltage limiting circuits 21 and 22 are configured of similar latch circuits.

Figure 5A:
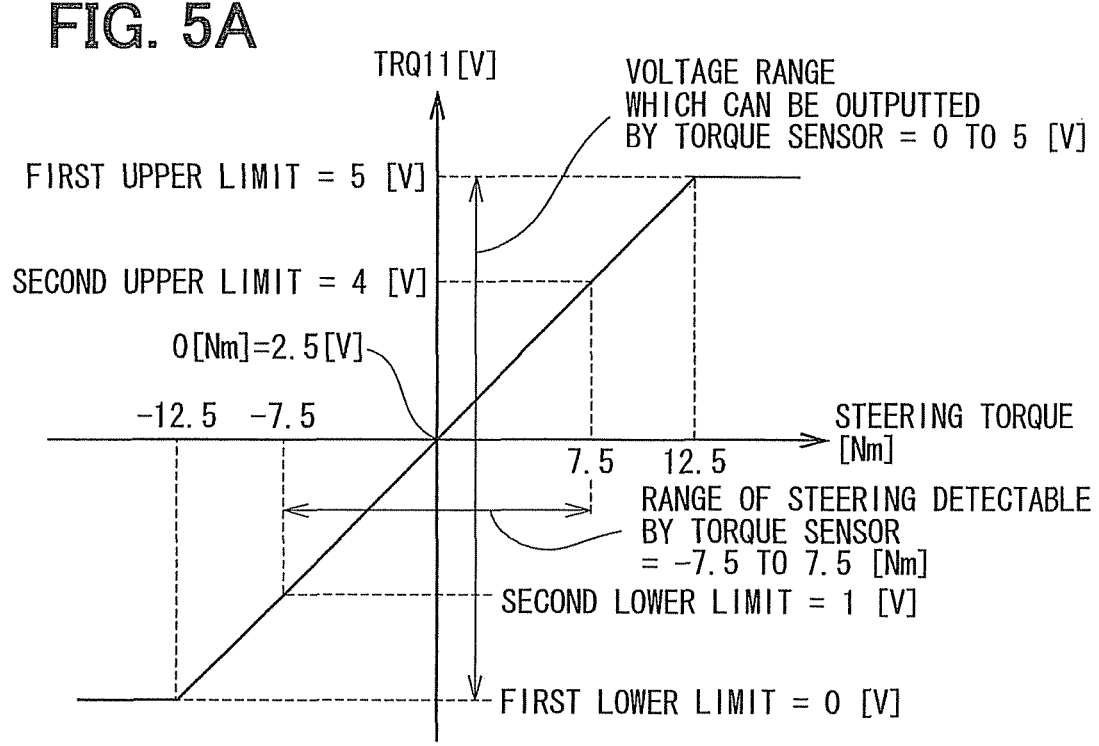
FIG. 5A is a graph showing a relationship between a steering torque and a detected torque signal.

In the present embodiment, the torque signals TRQ11 and TRQ21 and the monitoring signal TRQF can be values from 0 V to 5 V, as shown in FIG. 5A. That is, in the present embodiment, the first lower limit is 0 V and the first upper limit is 5 V. This range from 0 V to 5 V is recognizable by the control unit 50.

When no steering torque is generated, the torque signals TRQ11 and TRQ12 and the monitoring signal TRQF are a generally central value between the first lower limit and the second upper limit (2.5 V in the present embodiment). When the steering wheel 91 is steered rightward, the torque signals TRQ11 and TRQ12 and the monitoring signal TRQF are in the range of 2.5 V to 5 V responsive to the steering torque. When the steering wheel 91 is steered leftward, the torque signals TRQ11 and TRQ12 and the monitoring signal TRQF are in the range of 0 to 2.5 V responsive to the steering torque.

Figure 5B:
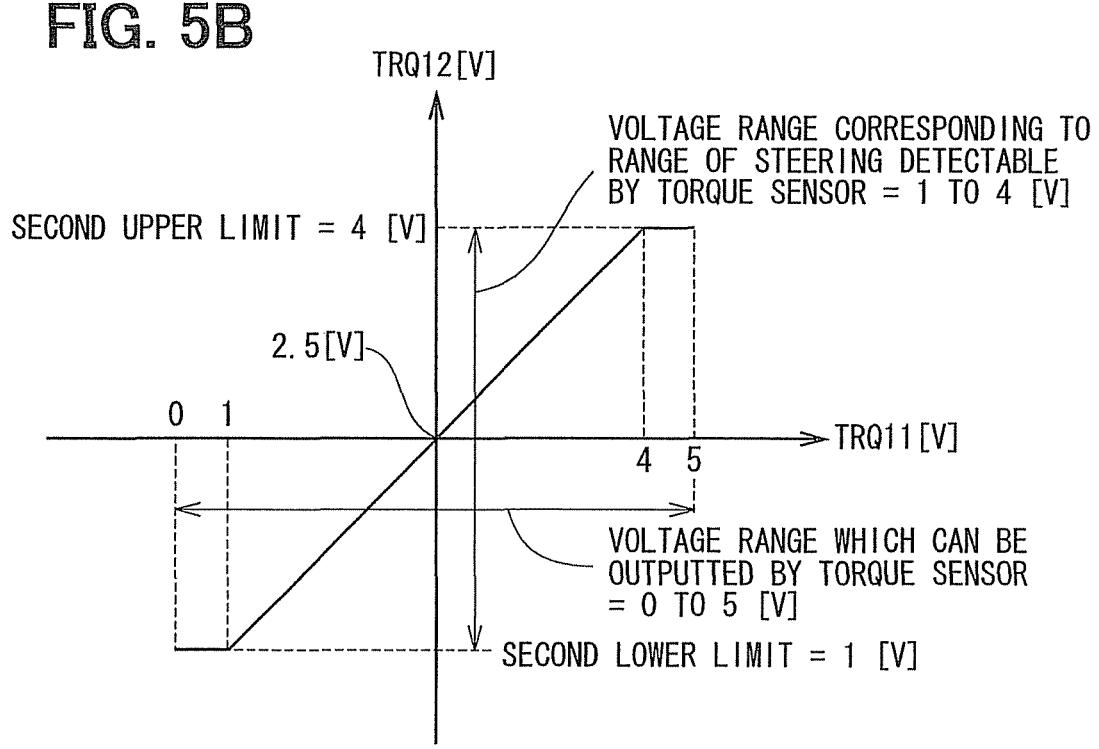
FIG. 5B is a graph showing a relationship between a detected torque signal and a torque signal whose upper and lower limits are restricted.

As shown in FIG. 5B, the voltage limiting circuit 21 restricts the upper and lower limits of the torque signal TRQ11 detected by the Hall IC 11 to from 1 to 4 V, and transmits the torque signal TRQ12 to the output section 40. The voltage limiting circuit 22 restricts the upper and lower limits of the torque signal TRQ21 detected by the Hall IC 12 to from 1 to 4V, and transmits a torque signal TRQ22 to the output section 40. That is, in the present embodiment, the second lower limit is 1 V and the second upper limit is 4 V. Thus, when the leftward steering torque is minus and the rightward steering torque is plus, the torque (−7.5 Nm to 7.5 Nm in the present embodiment) in the range equivalent to from the second lower limit to the second upper limit is detectable. FIG. 5A shows the torque signal TRQ11, and the torque signal TRQ21 and monitoring signal TRQF are similar to the torque signal TRQ11. FIG. 5B shows the torque signals TRQ11 and TRQ12, and the torque signal TRQ21 and TRQ22 are similar to the torque signals TRQ11 and TRQ12.

Figure 4:
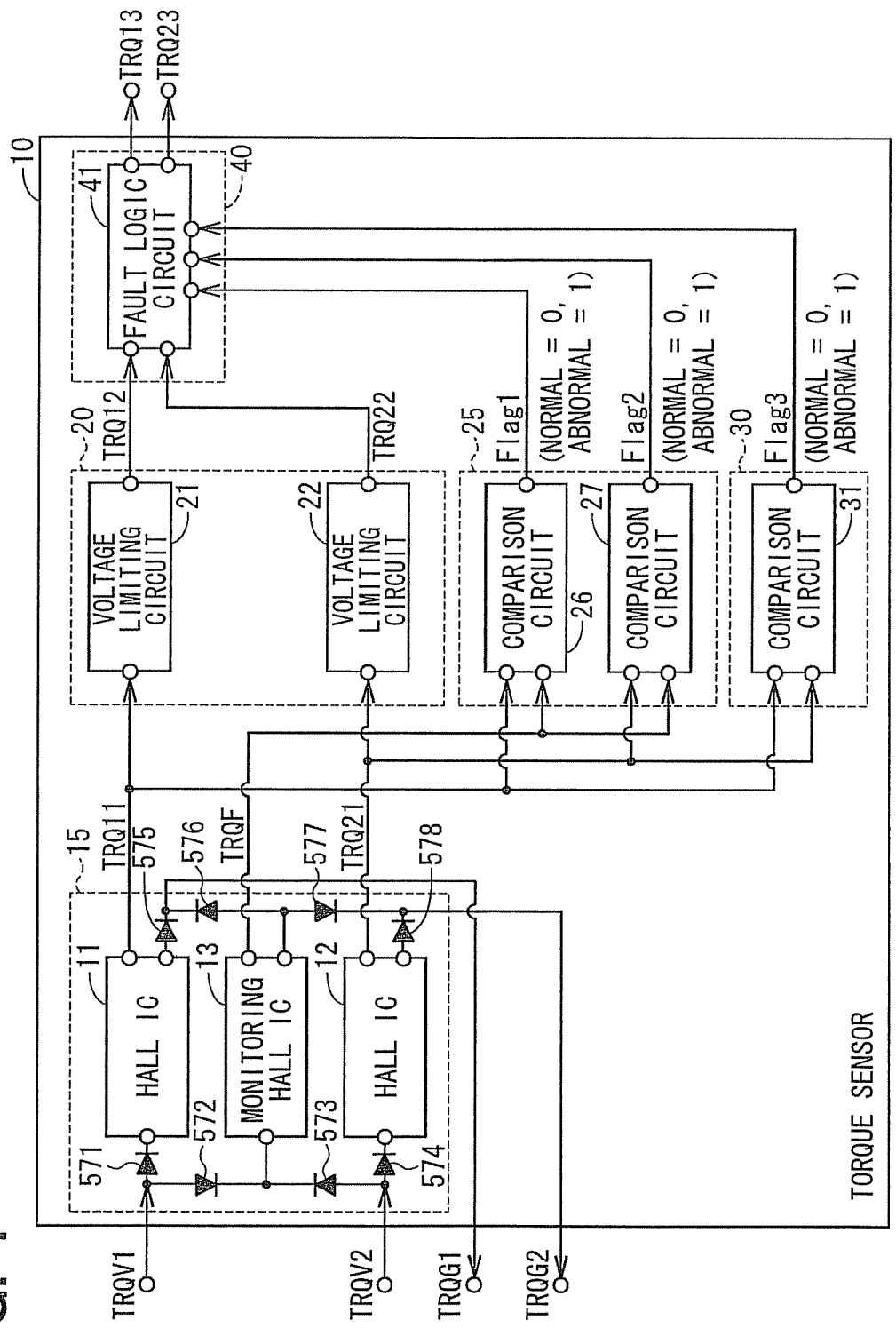
FIG. 4 is a block diagram showing a torque sensor according to the first embodiment of the present disclosure.

As shown in FIG. 4, the first abnormality determination section 25 has a comparison circuit 26 and a comparison circuit 27. The comparison circuit 26 compares the torque signal TRQ11 with the monitoring signal TRQF. In the present embodiment, the Hall IC 11 and monitoring Hall IC 13 are configured similarly, and when both are normal, the torque signal TRQ11 and monitoring signal TRQF are the same value. Then, a value of the torque signal TRQ11 is compared with a value of the monitoring signal TRQF in the comparison circuit 26. When the difference is a determination threshold or greater, the torque signal TRQ11 and monitoring signal TRQF are considered to be different. Then, an abnormality flag Flag1 is set, and Flag1=1 is transmitted to the output section 40. When the difference between the torque signal TRQ11 and monitoring signal TRQF is less than the determination threshold, the torque signal TRQ11 and monitoring signal TRQF are considered to be equal. The abnormality flag Flag1 is not set, and Flag1=0 is transmitted to the output section 40.

The comparison circuit 27 compares the torque signal TRQ21 with the monitoring signal TRQF. In the present embodiment, the Hall IC 12 and monitoring Hall IC 13 are configured similarly, and when both are normal, the torque signal TRQ21 and monitoring signal TRQF are the same value. Then, a value of the torque signal TRQ21 is compared with a value of the monitoring signal TRQF in the comparison circuit 27. When the difference is a determination threshold or greater, the torque signal TRQ21 and monitoring signal TRQF are considered to be different. Then, an abnormality flag Flag2 is set, and Flag2=1 is transmitted to the output section 40. When the difference between the torque signal TRQ21 and monitoring signal TRQF is less than the determination threshold, the torque signal TRQ21 and monitoring signal TRQF are considered to be equal. Then, the abnormality flag Flag2 is not set, and Flag2=0 is transmitted to the output section 40.

The second abnormality determination section 30 has a comparison circuit 31. The comparison circuit 31 compares the torque signal TRQ11 with the torque signal TRQ21. In the present embodiment, the Hall IC 11 and Hall IC 12 are configured similarly, and when both are normal, the torque signals TRQ11 and TRQ21 are the same value. Then, in the comparison circuit 31, values of the torque signals TRQ11 and TRQ21 are compared, and when the difference is a determination threshold or greater, the values of the torque signals TRQ11 and TRQ21 are considered to be different. An abnormality flag Flag3 is set, and Flag3=1 is transmitted to the output section 40. When the difference between the torque signals TRQ11 and TRQ21 is less than the determination threshold, the torque signals TRQ11 and TRQ21 are considered to be equal. The abnormality flag Flag3 is not set, and Flag3=0 is transmitted to the output section 40. The output section 40 has a fault logic circuit 41 to output, to the control unit 50, output signals TRQ13 and TRQ23 responsive to the abnormality flags Flag1, Flag2, and Flag3 transmitted from the first abnormality determination section 25 and the second abnormality determination section 30.

Here, the upper and lower limit restriction performed in the voltage limiting circuit 21 will be described with reference to the flowchart shown in FIG. 6. In S101, the torque signal TRQ11 is read. In S102, it is determined whether the torque signal TRQ11 is equal to or greater than 4 V which is the second upper limit. When it is determined that the torque signal TRQ11 is less than 4 V (S102: NO), the process proceeds to S104. When it is determined that the torque signal TRQ11 is 4 V or greater (S102: YES), the process proceeds to S103. In S103, the torque signal TRQ12 to be transmitted from the voltage limiting circuit 21 to the output section 40 is set to 4 V which is the second upper limit.

In S104 to which the process proceeds when it is determined that the torque signal TRQ11 is less than 4 V (S102: NO), it is determined whether the torque signal TRQ11 is equal to or less than 1 V which is the second lower limit. When it is determined that the torque signal TRQ11 is greater than 1 V (S104: NO), the process proceeds to S106. When it is determined that the torque signal TRQ11 is 1 V or less (S104: YES), the process proceeds to S105. In S105, the torque signal TRQ12 to be transmitted from the voltage limiting circuit 21 to the output section 40 is set to 1 V which is the second lower limit. In S106 to which the process proceeds when the torque signal TRQ11 is greater than 1 V and less than 4 V (S102: NO, S104: NO), the torque signal TRQ12 to be transmitted from the voltage limiting circuit 21 to the output section 40 is set to a value of the torque signal TRQ11. In S107, the torque signal TRQ12 is transmitted to the output section 40.

The upper and lower limit restriction performed in the voltage limiting circuit 22 will be described with reference to the flowchart shown in FIG. 7. The torque signal TRQ21 is read in S111. In S112, it is determined whether the torque signal TRQ21 is equal to or greater than 4 V which is the second upper limit. When it is determined that the torque signal TRQ21 is less than 4 V (S112: NO), the process proceeds to S114. When it is determined that the torque signal TRQ21 is 4 V or greater (S112: YES), the process proceeds to S113. In S113, the torque signal TRQ22 to be transmitted from the voltage limiting circuit 22 to the output section 40 is set to 4 V which is the second upper limit.

In S114 to which the process proceeds when it is determined the torque signal TRQ21 is less than 4 V (S112: NO), it is determined whether the torque signal TRQ21 is equal to or less than 1 V which is the second lower limit. When it is determined that the torque signal TRQ21 is greater than 1 V (S114: NO), the process proceeds to S116. When it is determined that the torque signal TRQ21 is 1 V or less (S114: YES), the process proceeds to S115. In S115, the torque signal TRQ22 to be transmitted from the voltage limiting circuit 22 to the output section 40 is set to 1 V which is the second lower limit. In S116 to which the process proceeds when the torque signal TRQ21 is greater than 1 V and less than 4 V (S112: NO, S114: NO), the torque signal TRQ22 to be transmitted from the voltage limiting circuit 22 to the output section 40 is set to a value of the torque signal TRQ21. In S117, the torque signal TRQ22 is transmitted to the output section 40.

Then, the comparison determination performed in the comparison circuit 26 will be described with reference to the flowchart shown in FIG. 8. In S201, the torque signal TRQ11 and monitoring signal TRQF are read. In S202, the abnormality flag Flag1 is reset and Flag1=0 (normal) is set.

In S203, it is determined whether an absolute value of the difference between the torque signal TRQ11 and monitoring signal TRQF is a determination threshold or greater. The determination threshold here is set to 0.5 V. When it is determined that the absolute value of the difference between the torque signal TRQ11 and monitoring signal TRQF is less than the determination threshold (S203: NO), the process proceeds to S205. When it is determined that the absolute value of the difference between the torque signal TRQ11 and monitoring signal TRQF is the determination threshold or greater (S203: YES), the process proceeds to S204. In S204, the abnormality flag Flag1 is set and Flag1=1 (abnormal) is set. In S205, the abnormality flag Flag1 is transmitted to the output section 40.

The comparison determination performed in the comparison circuit 27 will be described with reference to the flowchart shown in FIG. 9. In S211, the torque signal TRQ21 and monitoring signal TRQF are read. In S212, the abnormality flag Flag2 is reset and Flag2=0 (normal) is set.

In S213, it is determined whether the absolute value of the difference between the torque signal TRQ21 and monitoring signal TRQF is a determination threshold or greater. The determination threshold here is set to 0.5 V. When it is determined that the absolute value of the difference of the torque signal TRQ21 and monitoring signal TRQF is less than the determination threshold (S213: NO), the process proceeds to S215. When it is determined the absolute value of the difference between the torque signal TRQ21 and monitoring signal TRQF is the determination threshold or greater (S213: YES), the process proceeds to S214. In S214, the abnormality flag Flag2 is set and Flag2=1 (abnormal) is set. In S215, the abnormality flag Flag2 is transmitted to the output section 40.

The comparison determination performed in the comparison circuit 31 will be described with reference to the flowchart shown in FIG. 10. In S301, the torque signals TRQ11 and TRQ21 are read. In S302, the abnormality flag Flag3 is reset and Flag3=0 (normal) is set.

In S303, it is determined whether an absolute value of the difference between the torque signal TRQ11 and torque signal TRQ21 is a determination threshold or greater. The determination threshold here is set to 0.5 V. When it is determined that the absolute value of the difference between the torque signal TRQ11 and torque signal TRQ21 is less than the determination threshold (S303: NO), the process proceeds to S305. When it is determined that the absolute value of the difference between the torque signal TRQ11 and torque signal TRQ21 is the determination threshold or greater (S303: YES), the process proceeds to S304. In S304, the abnormality flag Flag3 is set and Flag3=1 (abnormal) is set. In S305, the abnormality flag Flag3 is transmitted to the output section 40.

In the present embodiment, when the absolute value of the difference between two signals among the torque signal TRQ11, the torque signal TRQ21, and monitoring signal TRQF is less than the determination threshold, it is determined that the two signals are normal, and the corresponding abnormality flag Flag1, Flag2, or Flag3 is set to 0 (normal). When the absolute value of the difference between the two signals is the determination threshold or greater, it is determined that at least one of the two signals is abnormal, and the corresponding abnormality flag Flag1, Flag2, or Flag3 is set to 1.

Next, the output signal identification performed in the fault logic circuit 41 will be described with reference to the flowchart shown in FIG. 11. In S401, the torque signals TRQ12 and TRQ22 transmitted from the limiting circuit sections 20, the abnormality flags Flag1 and Flag2 transmitted from the first abnormality determination section 25, and the abnormality flag Flag3 transmitted from the second abnormality determination section 30 are read. In S402, it is determined whether the abnormality flag Flag1 is 0 (normal). When it is determined that the abnormality flag Flag1 is not 0 (S402: NO), namely, when the abnormality flag Flag1 is 1, the process proceeds to S409. When it is determined that the abnormality flag Flag1 is 0 (S402: YES), the process proceeds to S403.

In S403, it is determined whether the abnormality flag Flag2 is 0 (normal). When it is determined that the abnormality flag Flag2 is not 0, namely when the abnormality flag Flag2 is 1 (S403: NO), the process proceeds to S406. When it is determined that the abnormality flag Flag2 is 0 (S403: YES), the process proceeds to S404. In S404, it is determined whether the abnormality flag Flag3 is 0 (normal). When it is determined that the abnormality flag Flag3 is 0, the process proceeds to S405.

In S405, since the torque signals TRQ11 and TRQ21 detected by the Hall IC 11 and the Hall IC 12 are both normal, the output signal TRQ13 corresponding to the torque signal TRQ11 detected by the Hall IC 11 is set to the torque signal TRQ12 which is a value based on the torque signal TRQ11 and which is transmitted from the limiting circuit section 20. Additionally, the output signal TRQ23 corresponding to the torque signal TRQ21 detected by the Hall IC 12 is set to the torque signal TRQ22 which is a value based on the torque signal TRQ21 and which is transmitted from limiting circuit section 20.

When it is determined in S404 that the abnormality flag Flag3 is not 0 (S404: NO), i.e., when the abnormality flag Flag3 is 1, abnormality may has occurred in the torque signal TRQ11 or torque signal TRQ12. However, the abnormality flags Flag1 and Flag2 transmitted from the first abnormality determination section 25 are both 0 (normal) (S402: YES, S403: YES). Thus, to avoid a false determination that abnormality has occurred, the process proceeds to S405. Then, the output signal TRQ13 is set to the torque signal TRQ12, and the output signal TRQ23 is set to the torque signal TRQ22.

In S406 to which the process proceeds when it is determined that the abnormality flag Flag1 is 0 and the abnormality flag Flag2 is 1 (S402: YES, S403: NO), it is determined whether the abnormality flag Flag3 is 0 (normal). When it is determined that the abnormality flag Flag3 is not 0 (S406: NO), i.e., when the abnormality flag Flag3 is 1, the process proceeds to S408. When it is determined that the abnormality flag Flag3 is 0 (S406: YES), the process proceeds to S407.

In S407, abnormality may have occurred in the torque signal TRQ21 detected by the Hall IC 12, but the abnormality flag Flag3 transmitted from the second abnormality determination section 30 is 0 (normal) (S406: YES). Thus, to avoid a false determination that abnormality has occurred, the output signal TRQ13 is set to the torque signal TRQ12, and the output signal TRQ23 is set to the torque signal TRQ22.

In S408 to which the process proceeds when it is determined that the abnormality flag Flag2 is 1 and the abnormality flag Flag3 is 1 (S403: NO, S406: NO), the torque signal TRQ11 detected by Hall IC 11 is normal. Thus, the output signal TRQ13 corresponding to the torque signal TRQ11 detected by the Hall IC 11 is set to the torque signal TRQ12, which is a value based on the torque signal TRQ11 and which is transmitted from the limiting circuit section 20. On the other hand, it is determined that abnormality has occurred in the torque signal TRQ21 detected by the Hall IC 12. The output signal TRQ23 is set to a second fault notification signal which is a value between the first upper limit and the second upper limit as a signal showing that abnormality has occurred. In the present embodiment, the second fault notification signal is 4.3 V.

In S409 to which the process proceeds when it is determined that the abnormality flag Flag1 is not 0 (S401: NO), it is determined whether the abnormality flag Flag2 is 0 (normal). When it is determined that the abnormality flag Flag2 is not 0, (S409: NO), i.e., when the abnormality flag Flag2 is 1, the process proceeds to S413. When it is determined that the abnormality flag Flag2 is 0 (S409: YES), the process proceeds to S410.

In S410, it is determined whether the abnormality flag Flag3 is 0 (normal). When it is determined that the abnormality flag Flag3 is not 0 (S410: NO), i.e., when the abnormality flag Flag3 is 1, the process proceeds to S412. When it is determined that the abnormality flag Flag3 is 0 (S410: YES), the process proceeds to S411.

In S411, abnormality may have occurred in the torque signal TRQ11 detected by the Hall IC 11, but the abnormality flag Flag3 transmitted from the second abnormality determination section 30 is 0 (normal) (S410: YES). Thus, to avoid a false determination that abnormality has occurred, the output signal TRQ13 is set to the torque signal TRQ12, and the output signal TRQ23 is set to the torque signal TRQ22.

In S412 to which the process proceeds when it is determined that the abnormality flag Flag1 is 1 and the abnormality flag Flag3 is 1 (S402: NO, S410: NO), it is determined that abnormality has occurred in the torque signal TRQ11 detected by the Hall IC 11. Then, the output signal TRQ13 is set to 4.3 V which is the second fault notification signal as a signal showing that abnormality has occurred. On the other hand, the torque signal TRQ21 detected by the Hall IC 12 is normal. The output signal TRQ23 corresponding to the torque signal TRQ21 detected by the Hall IC 12 is set to the torque signal TRQ22, which is a value based on the torque signal TRQ21 and which is transmitted from the limiting circuit section 20.

In S413 to which the process proceeds when it is determined that the abnormality flag Flag2 is not 0 (S409: NO), it is determined whether the abnormality flag Flag3 is 0 (normal). When it is determined that the abnormality flag Flag3 is not 0 (S413: NO), i.e., when the abnormality flag Flag3 is 1, the process proceeds to S415. When it is determined that the abnormality flag Flag3 is 0 (S413: YES), the process proceeds to S414.

In S414, it is identified that the torque signals TRQ11 and TRQ21 detected by the Hall ICs 11 and 12 are normal and abnormality has occurred in the monitoring signal TRQF detected by the monitoring Hall IC 13. In the present embodiment, the output signal TRQ23 corresponding to the normal torque signal TRQ21 is set to a first fault notification signal which shows that abnormality has occurred in the monitoring Hall IC 13 and which is a value between the first lower limit and the second lower limit, instead of the torque signal TRQ22 which is a value based on the torque signal TRQ21. In the present embodiment, the first fault notification signal is set to 0.7 V. The output signal TRQ13 corresponding to the torque signal TRQ11 detected by the Hall IC 11 is the torque signal TRQ12.

When it is determined that the abnormality flag Flag1 is 1, the abnormality flag Flag2 is 1, and the abnormality flag Flag3 is 1 (S402: NO, S409: NO, S413: NO), it is determined that multiple faults have occurred, and the output signals TRQ13 and TRQ23 are set to 0.7 V which is the first fault notification signal as a signal showing that abnormality has occurred. In S416, the output signals TRQ13 and TRQ23 are transmitted to the control unit 50.

Figure 11:
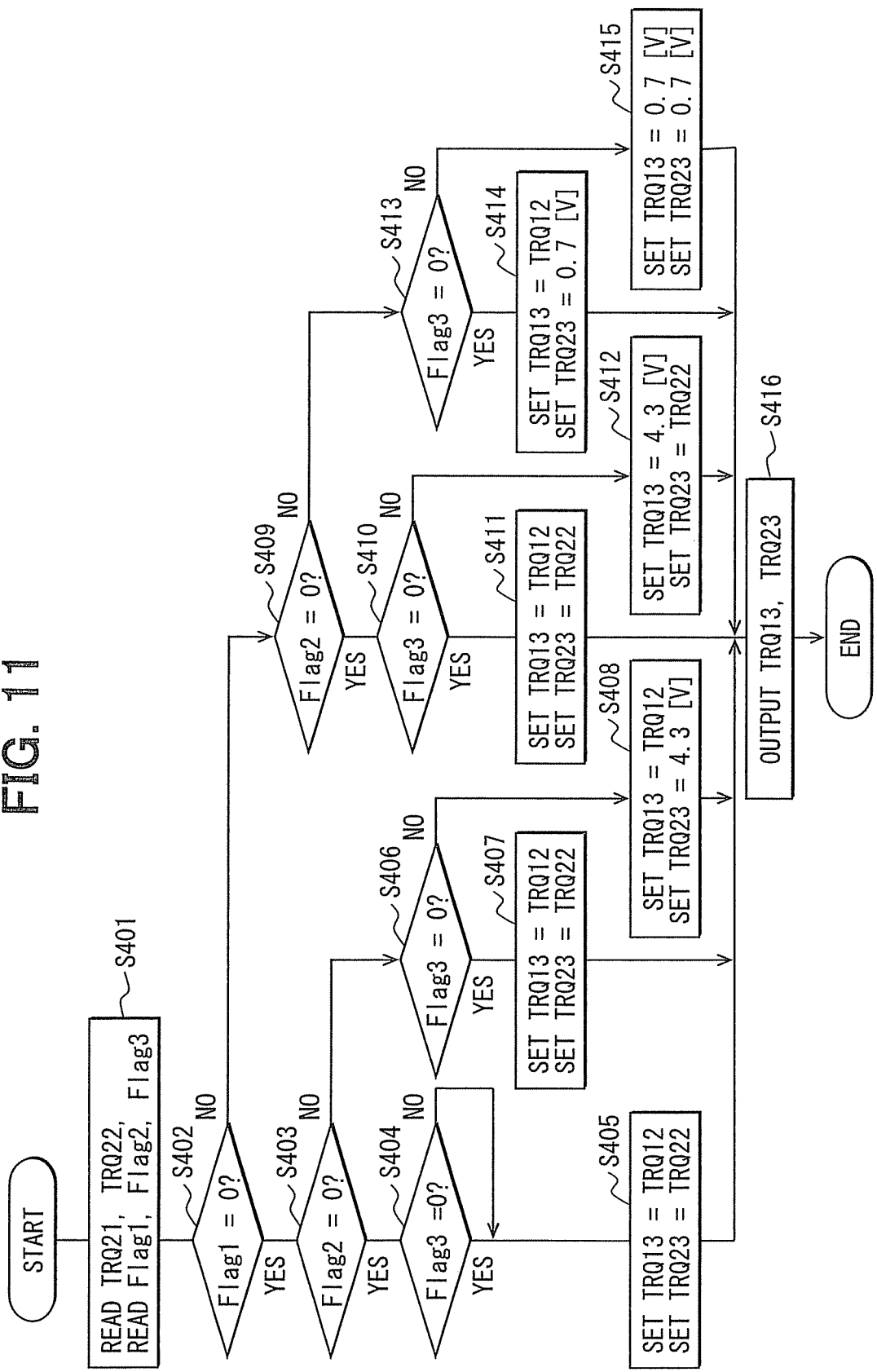
FIG. 11 is a flowchart showing an identification of output signals in the first embodiment of the present disclosure.

Here, the determination result in the fault logic circuit 41 described with reference to the flowchart shown in FIG. 11 is shown in FIG. 12. As shown in FIG. 12, when the abnormality flag Flag1 is 1, the abnormality flag Flag2 is 0, and the abnormality flag Flag3 is 1 (S402: NO, S409: YES, S410: NO in FIG. 11), it is determined that the abnormality has occurred in the torque signal TRQ11 detected by the Hall IC 11. Then, the output signal TRQ13 is set to 4.3 V which is the second fault notification signal, and the output signal TRQ23 is set to TRQ22 which is the normal signal.

When the abnormality flag Flag1 is 0, the abnormality flag Flag2 is 1, and the abnormality flag Flag3 is 1 (S402: YES, S403: NO, S406: NO), it is determined that the abnormality has occurred in the torque signal TRQ21 detected by the Hall IC 12. Then, the output signal TRQ13 is TRQ12 which is the normal signal, and the signal TRQ23 is 4.3 V which is the second fault notification signal.

When the abnormality flag Flag1 is 1, the abnormality flag Flag2 is 1, and the abnormality flag Flag3 is 0 (S402: NO, S409: NO, S413: YES), it is determined that the abnormality has occurred in the monitoring signal TRQF detected by the monitoring Hall IC 13. Then, the output signal TRQ13 is set to TRQ12 which is the normal signal, and the output signal TRQ23 is set to 0.7 V which is the first fault notification signal.

In the present embodiment, when abnormality has occurred in the torque signals detected by the Halls ICs 11 and 12 or the monitoring Hall IC 13, two of the abnormality flags Flag1, Flag2, and Flag3, are set, but a difference in determination time may be produced due to a circuit characteristic etc., and thus only any one of the abnormality flags Flag1, Flag2, and Flag3 may be set. In this case, abnormality may have occurred in any of the Hall ICs 11, 12, and monitoring Hall IC 13. To avoid a false determination that abnormality has occurred, the output signal TRQ13 and TRQ23 are set to TRQ12 and TRQ22 which are both normal signals. The determination result in which the normal signal is transmitted to avoid the false determination although abnormality may have occurred is described as "temporarily normal" in FIG. 12.

Since multiple faults have occurred when all the abnormality flags Flag1, Flag2, and Flag3 are 1 (S402: NO, S409: NO, S413: NO), the output signals TRQ13 and TRQ23 are set to 0.7 V which is the first fault notification signal. When all the abnormality flags Flag1, Flag2, and Flag3 are 0, the Hall ICs 11 and 12 and the monitoring Hall IC 13 are all normal. Accordingly, the output signals TRQ13 and TRQ23 are set to TRQ12 and TRQ22 which are both normal signals.

In the present embodiment, when abnormality has occurred in the torque signal TRQ11 or TRQ21 detected by the Hall IC 11 or Hall IC 12, the output signal TRQ13 or TRQ23 is set to 4.3 V which is the second fault notification signal, and when abnormality has occurred in the monitoring signal TRQF detected by the monitoring Hall IC 13, one of the output signals TRQ13, TRQ23 is 0.7 V which is the first fault notification signal. FIGS. 13A-13D show variation of the output signals TRQ13 and TRQ23. In FIGS. 13A, 13B, 13C, and 13D, the temporarily normal cases and the case in which all are abnormal in FIG. 12 are omitted, and FIG. 13A corresponds to FIG. 12. As shown in FIG. 13B, when abnormality has occurred in the monitoring signal TRQF detected by the monitoring Hall IC 13, the output signal TRQ13 may be set to 0.7 V which is the first fault notification signal, and the output signal TRQ23 may be TRQ22 which is the normal signal. In this case, when all the abnormality flags Flag1 to Flag3 are 1, the output signals TRQ13 and TRQ23 are both set to 0.7 V which is the first fault notification signal.

As shown in FIG. 13C, when abnormality has occurred in the torque signal TRQ11 or TRQ12 detected by the Hall IC 11 or Hall IC 12, the output signal TRQ13 or TRQ23 is set to 0.7 V which is the first fault notification signal, and when abnormality has occurred in the monitoring signal TRQF detected by the monitoring Hall IC 13, the output signal TRQ23 may be 4.3 V which is the second fault notification signal. As shown in FIG. 13D, when abnormality has occurred in the monitoring signal TRQF detected by the monitoring Hall IC 13, the output signal TRQ13 may be set to 4.3 V which is the second fault notification signal, and the output signal TRQ23 may be TRQ22 which is the normal signal. In the examples shown in FIGS. 13C and 13D, when all the abnormality flags Flag1 to Flag3 are 1, the output signals TRQ13 and TRQ23 are both set to 4.3 V which is the second fault notification signal.

It is noted that 4.3 V, which is transmitted as a signal notifying a fault, corresponds to "the second fault notification signal which is a value between the first upper limit and the second upper limit," 0.7 V, which is transmitted as a signal notifying a fault, corresponds to "the first fault notification signal which is a value between the first lower limit and the second lower limit." The torque signal TRQ12, which is transmitted when no abnormality has occurred in the torque signal TRQ11, corresponds to "the normal signal which is a value based on the torque signal TRQ11 and which is a value between the second lower limit and the second upper limit," and the torque signal TRQ22, which is transmitted when no abnormality has occurred in the torque signal TRQ21, corresponds to "the normal signal which is a value based on torque signal TRQ21 and which is a value between the second lower limit and the second upper limit."

The output signal TRQ13 transmitted from the output section 40 is transmitted to the control unit 50 via the signal line 61 shown in FIG. 3, and is transmitted from the AD converter terminal 511 to the microcomputer 51. The output signal TRQ23 is transmitted to the control unit 50 via the signal line 62, and is transmitted from the AD converter terminal 512 to the microcomputer 51. Hereinafter, the output signal TRQ13 which is analog-to-digital converted by the AD converter terminal 511 is called an "output signal TRQ15," the output signal TRQ23 which is analog-to-digital converted by the AD converter terminal 512 is called an "output signal TRQ25," a voltage signal of the power supply line 63, the voltage signal being analog-to-digital converted by the AD converter terminal 513, is called a "battery signal TRQV1," and a voltage signal of the power supply line 64, the voltage signal being analog-to-digital converted by the AD converter terminal 514, is called a "battery signal TRQV2."

Figure 14:
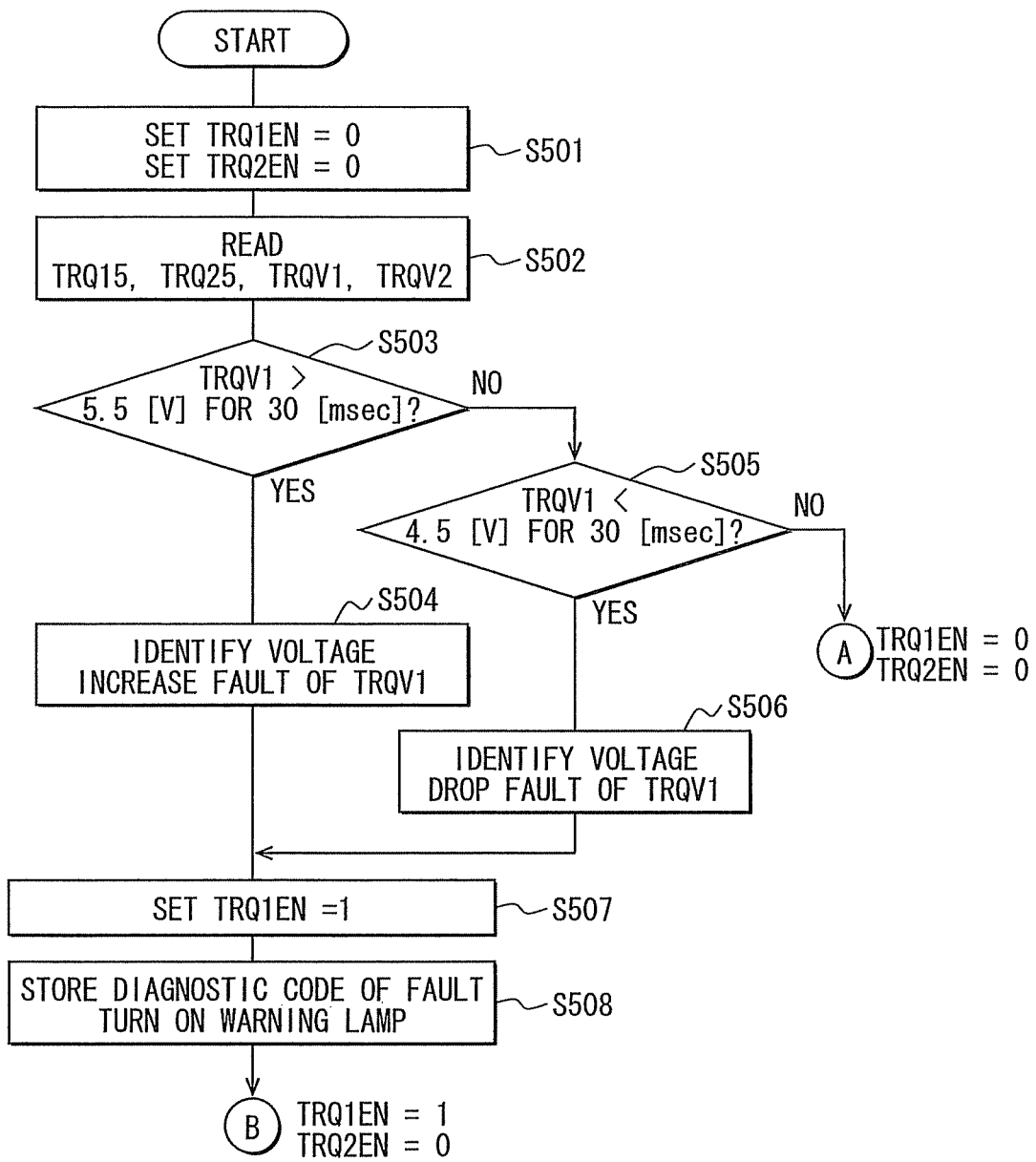
FIG. 14 is a flowchart showing a failure diagnosis in the first embodiment of the present disclosure.

Next, the fault diagnosis performed by the control unit 50 will be described with reference to the flowcharts shown in FIGS. 14 to 18. As shown in FIG. 14, in S501, a prohibition flag TRQ1EN which prohibits use of the output signal TRQ15 of the Hall IC 11 is initialized to permission, and then TRQ1EN is set to 0. A prohibition flag TRQ2EN which prohibits use of the output signal TRQ25 of the Hall IC 12 is initialized to permission, and then TRQ2EN is set to 0. In S502, the output signals TRQ15 and TRQ25 and battery signals TRQV1 and TRQV2 are read.

In S503, it is determined whether the state where the battery signal TRQV1 is greater than a power fault upper threshold (for example, 5.5 V) of the internal power source 56 has continued for a predetermined time (for example, 30 msec). When it is determined that the state where the battery signal TRQV1 is greater than the power fault upper threshold has not continued for the predetermined time (S503: NO), the process proceeds to S505. When it is determined that the state where the battery signal TRQV1 is larger than the power fault upper threshold has continued for the predetermined time (S503: YES), the process proceeds to S504. In S504, it is identified that a voltage increase fault has occurred in the battery signal TRQV1.

In S505 to which the process proceeds when it is determined that the state where the battery signal TRQV1 is greater than the power fault upper threshold has not continued for the predetermined time (S503: NO), it is determined whether the state where the battery signal TRQV1 is less than a power fault lower threshold (for example, 4.5 V) of the internal power source 56 has continued for a predetermined time (for example, 30 msec). When it is determined that the state where the battery signal TRQV1 is less than the power fault lower threshold has not continued for the predetermined time (S505: NO), the process proceeds to S509. When it is determined that the state where the battery signal TRQV1 is less than the power fault lower threshold has continued for the predetermined time (S505: YES), the process proceeds to S506. In S506, a voltage drop fault of the battery signal TRQV1 is identified as having occurred.

In S507, it is determined that the output signal TRQ15 of the Hall IC 11 is prohibited from being used in the steering torque calculation, and the prohibition flag TRQ1EN is set. That is, TRQ1EN is set to 1. In S508, a diagnostic code of the fault is stored and a warning lamp is turned on.

Figure 15:
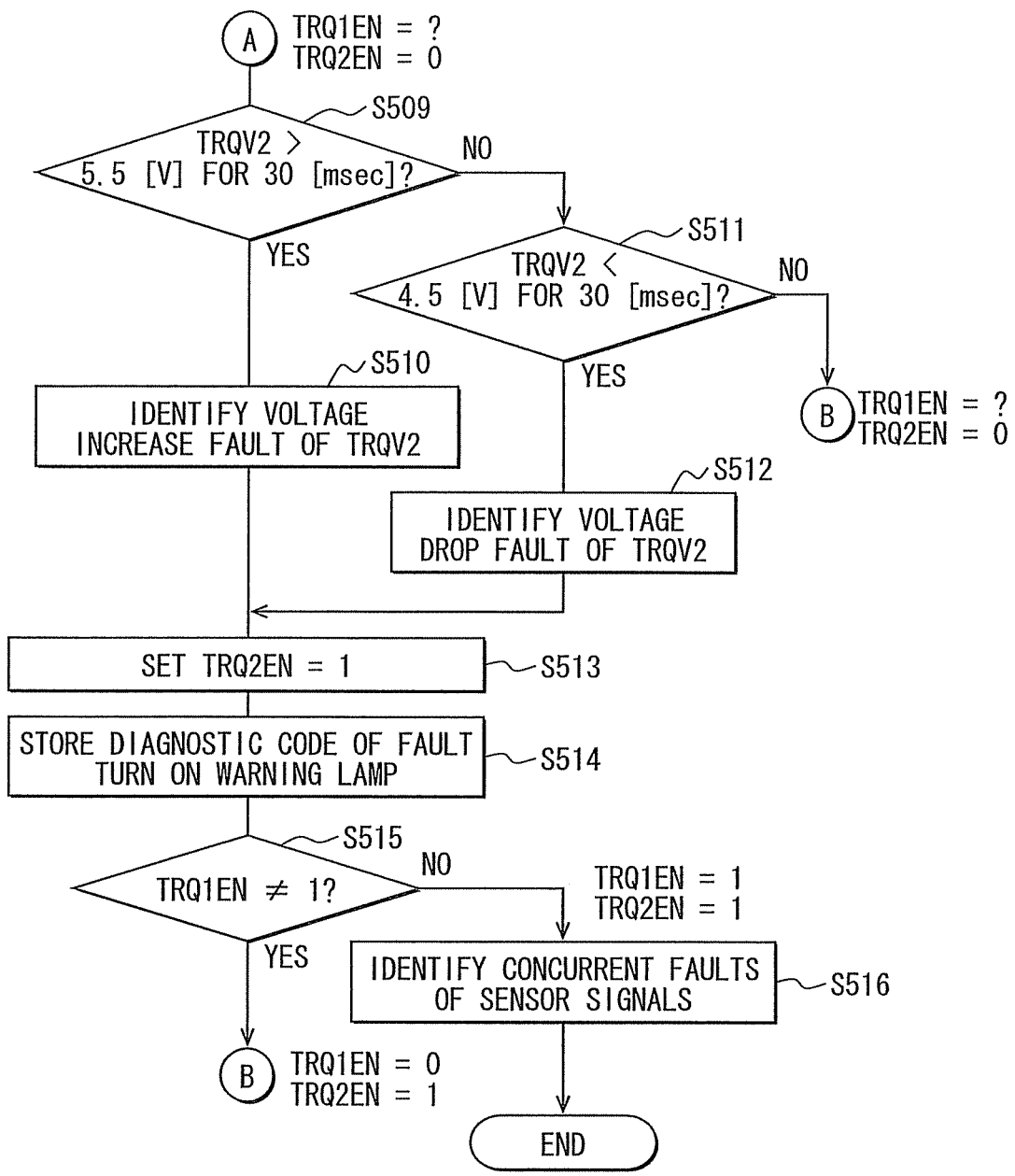
FIG. 15 is a flowchart showing the failure diagnosis in the first embodiment of the present disclosure.

As shown in FIG. 15, in S509 to which the process proceeds when it is determined that the state where the battery signal TRQV1 is greater than the power fault upper threshold has not continued for the predetermined time (S503: NO) and when it is determined that the state where the battery signal TRQV1 is less than the power fault lower threshold has not continued for the predetermined time (S505: NO), it is determined whether the state where the battery signal TRQV2 is greater than a power fault upper threshold (for example, 5.5 V) of the internal power source 57 has continued for a predetermined time (for example, 30 msec). When it is determined that the state where the battery signal TRQV2 is greater than the power fault upper threshold has not continued for the predetermined time (S509: NO), the process proceeds to S511. When it is determined that the state where the battery signal TRQV2 is greater than the power fault upper threshold has continued for the predetermined time (S509: YES), the process proceeds to S510. In S510, a voltage increase fault of the battery signal TRQV2 is identified as having occurred.

In S511 to which the process proceeds when it is determined that the state where the battery signal TRQV2 is greater than the power fault upper threshold has not continued for the predetermined time (S509: NO), it is determined whether the state where the battery signal TRQV2 is less than a power fault lower threshold (for example, 4.5 V) of the internal power source 57 has continued for a predetermined time (for example, 30 msec). When it is determined that the state where the battery signal TRQV2 is less than the power fault lower threshold has not continued for the predetermined time (S511: NO), the process proceeds to S517. When it is determined that the state where the battery signal TRQV2 is less than the power fault lower threshold has continued for the predetermined time (S511: YES), the process proceeds to S512. In S512, a voltage drop fault of the battery signal TRQV2 is identified as having occurred.

In S513, it is determined that the output signal TRQ25 of the Hall IC 12 is prohibited from being used in the steering torque calculation, and the prohibition flag TRQ2EN is set. That is, the TRQ2EN is set to 1. In S514, a diagnostic code of the fault is stored and a warning lamp is turned on.

In S515, it is determined whether the prohibition flag TRQ1EN of the output signal TRQ15 has been set, that is, it is determined whether TRQ1EN is not 1. When the prohibition flag TRQ1EN of the output signal TRQ15 is not set (S515: YES), in other words, when TRQ1EN is not 1, i.e., TRQ1EN is 0, the process proceeds to S517. When the prohibition flag TRQ1EN of the output signal TRQ15 is set (S515: NO), i.e., when TRQ1EN is 1, the process proceeds to S516. In S516, a sensor signal concurrent fault in which either the output signal TRQ15 or TRQ25 cannot be used is identified as having occurred. Then, the assistance processing for reducing steering torque is stopped.

Figure 16:
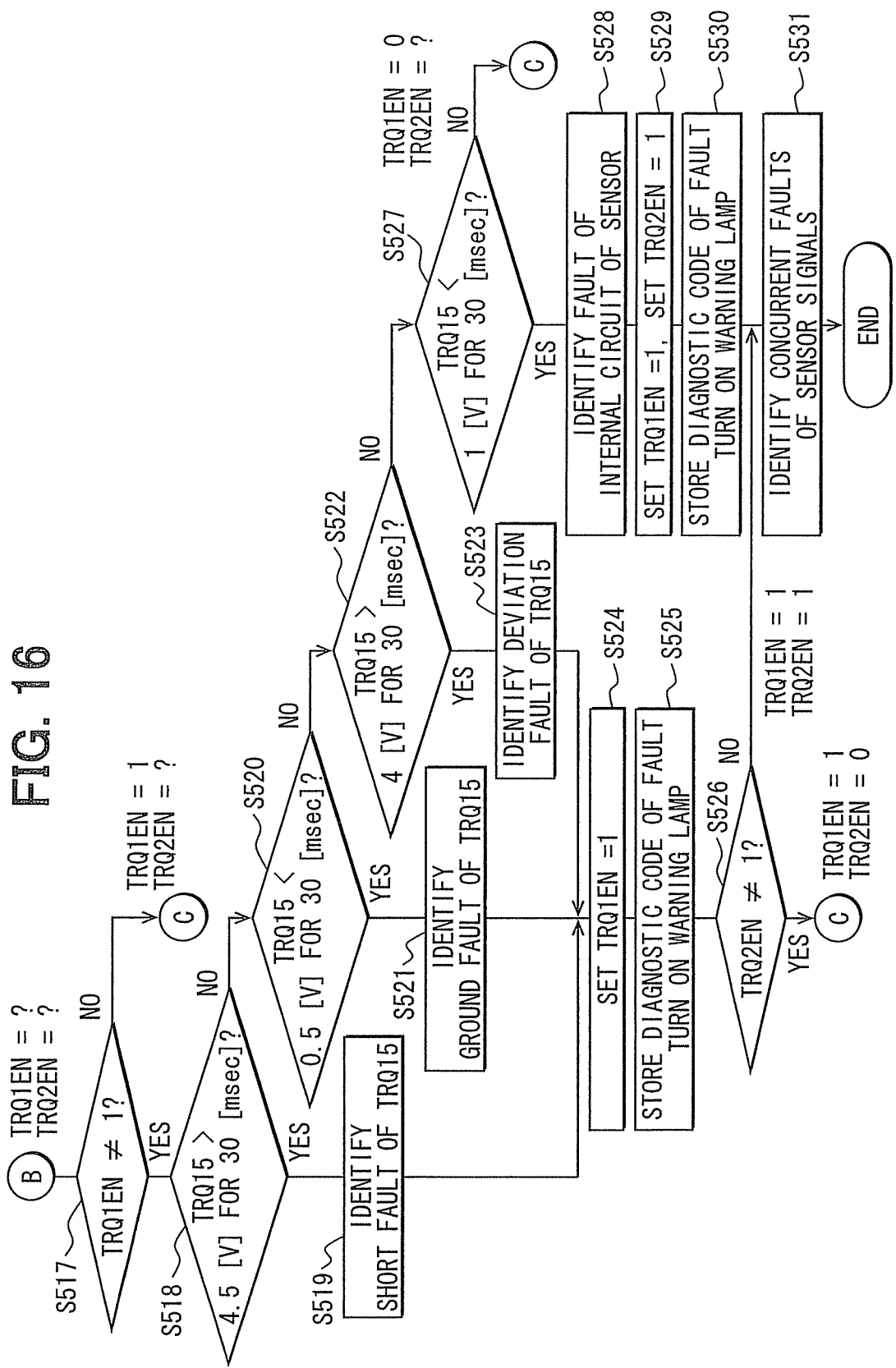
FIG. 16 is a flowchart showing the failure diagnosis in the first embodiment of the present disclosure.

As shown in FIG. 16, when it is determined that the state where the battery signal TRQV2 is greater than the power fault upper threshold has not continued for the predetermined time (S509: NO) and when it is determined that the state where the battery signal TRQV2 is less than the power fault lower threshold has not continued for the predetermined time (S511: NO), or in S517 to which the process proceeds when the prohibition flag TRQ1EN of the output signal TRQ15 is not set (S515: YES), it is determined whether the prohibition flag TRQ1EN of the output signal TRQ15 is set, namely, whether TRQ1EN is not 1. When the prohibition flag TRQ1EN of the output signal TRQ15 is set (S517: NO), i.e., when TRQ1EN is 1, the process proceeds to S532. When the prohibition flag TRQ1EN of the output signal TRQ15 is not set (S517: YES), in other words, when TRQ1EN is not 1, i.e., TRQ1EN is 0, the process proceeds to S518.

In S518, it is determined whether the state where the output signal TRQ15 is greater than a short fault threshold (for example, 4.5 V) has continued for a predetermined time (for example, 30 msec). When it is determined that the state where the output signal TRQ15 is greater than the short fault threshold has not continued for the predetermined time (S518: NO), the process proceeds to S520. When it is determined that the state where the output signal TRQ15 is greater than the short fault threshold has continued for the predetermined time (S518: YES), the process proceeds to S519. In S519, the short fault is identified as having occurred in the output signal TRQ15, and the process proceeds to S524. Specifically, the short fault of the power supply line 63 coupled to the Hall IC 11 or the disconnection fault of the ground line 66 coupled to the Hall IC 11 is identified as having occurred.

In S520 to which the process proceeds when it is determined that the state where the output signal TRQ15 is greater than the short fault threshold has not continued for the predetermined time (S518: NO), it is determined whether the state where the output signal TRQ15 is less than a ground fault threshold (for example, 0.5 V) has continued for a predetermined time. When it is determined that the state where the output signal TRQ15 is less than the ground fault threshold has not continued for the predetermined time (S520: NO), the process proceeds to S522. When it is determined that the state where the output signal TRQ15 is less than the ground fault threshold has continued for the predetermined time (S520: YES), the process proceeds to S521. In S521, the ground fault is identified as having occurred in the output signal TRQ15, and the process proceeds to S524. Specifically, the disconnection fault of the power supply line 63 coupled to the Hall IC 11 or the short fault of the ground line 66 coupled to the Hall IC 11 is identified as having occurred.

In S522 to which the process proceeds when it is determined that the state where the output signal TRQ15 is less than the ground fault threshold has not continued for the predetermined time (S520: NO), it is determined whether the state where the output signal TRQ15 is greater than a torque signal deviation failure threshold (for example, 4 V) has continued for a predetermined time (for example, 30 msec). When it is determined that the state where the output signal TRQ15 is greater than the torque signal deviation fault threshold has not continued for the predetermined time or greater (S522: NO), the process proceeds to S527. When it is determined that the state where the output signal TRQ15 is greater than the torque signal deviation fault threshold has continued for the predetermined time or greater (S522: YES), the process proceeds to S523. In S523, the deviation fault is identified as having occurred in the output signal TRQ15, and the process proceeds to S524.

In S524, it is determined that the output signal TRQ15 of the Hall IC 11 is prohibited from being used in the steering torque calculation, and the prohibition flag TRQ1EN is set. That is, TRQ1EN is set to 1. In S525, a diagnostic code of the fault is stored and a warning lamp is turned on. In S526, it is determined whether the prohibition flag TRQ2EN of the output signal TRQ25 is set, namely, whether TRQ2EN is 1. When the prohibition flag TRQ2EN of the output signal TRQ25 is not set (S526: YES), in other words, when TRQ2EN is not 1, i.e., TRQ2EN is 0, the process proceeds to S532. When the prohibition flag TRQ2EN of the output signal TRQ25 is set (S526: NO), i.e., when TRQ2EN is 1, the process proceeds to S531.

In S527 to which the process proceeds when it is determined that the state where the output signal TRQ15 is greater than the torque signal deviation fault threshold has not continued for the predetermined time or greater (S522: NO), it is determined whether the state where the output signal TRQ15 is less than a monitoring signal deviation fault threshold (for example, 1 V) has continued for a predetermined time (for example, 30 msec). When it is determined that the state where the output signal TRQ15 is less than the monitoring signal deviation fault threshold has not continued for the predetermined time or greater (S527: NO), the process proceeds to S532. When it is determined that the state where the output signal TRQ15 is less than the monitoring signal deviation fault threshold has continued for the predetermined time or greater (S527: YES), the process proceeds to S528.

In S528, the deviation fault has occurred in the monitoring signal TRQF which is identified as an internal circuit fault of the torque sensor 10. In S529, it is determined that the output signal TRQ15 of the Hall IC 11 and the output signal TRQ25 of the Hall IC 12 are both prohibited from being used in the steering torque calculation, and the prohibition flag is set. That is, TRQ1EN is set to 1 and TRQ2EN is set to 1. In S530, a diagnostic code of the fault is stored and a warning lamp is turned on. In S531, it is determined that a sensor signal concurrent fault in which either the output signal TRQ15 or TRQ25 cannot be used has occurred, and the assistance processing for reducing steering torque is stopped.

Figure 17:
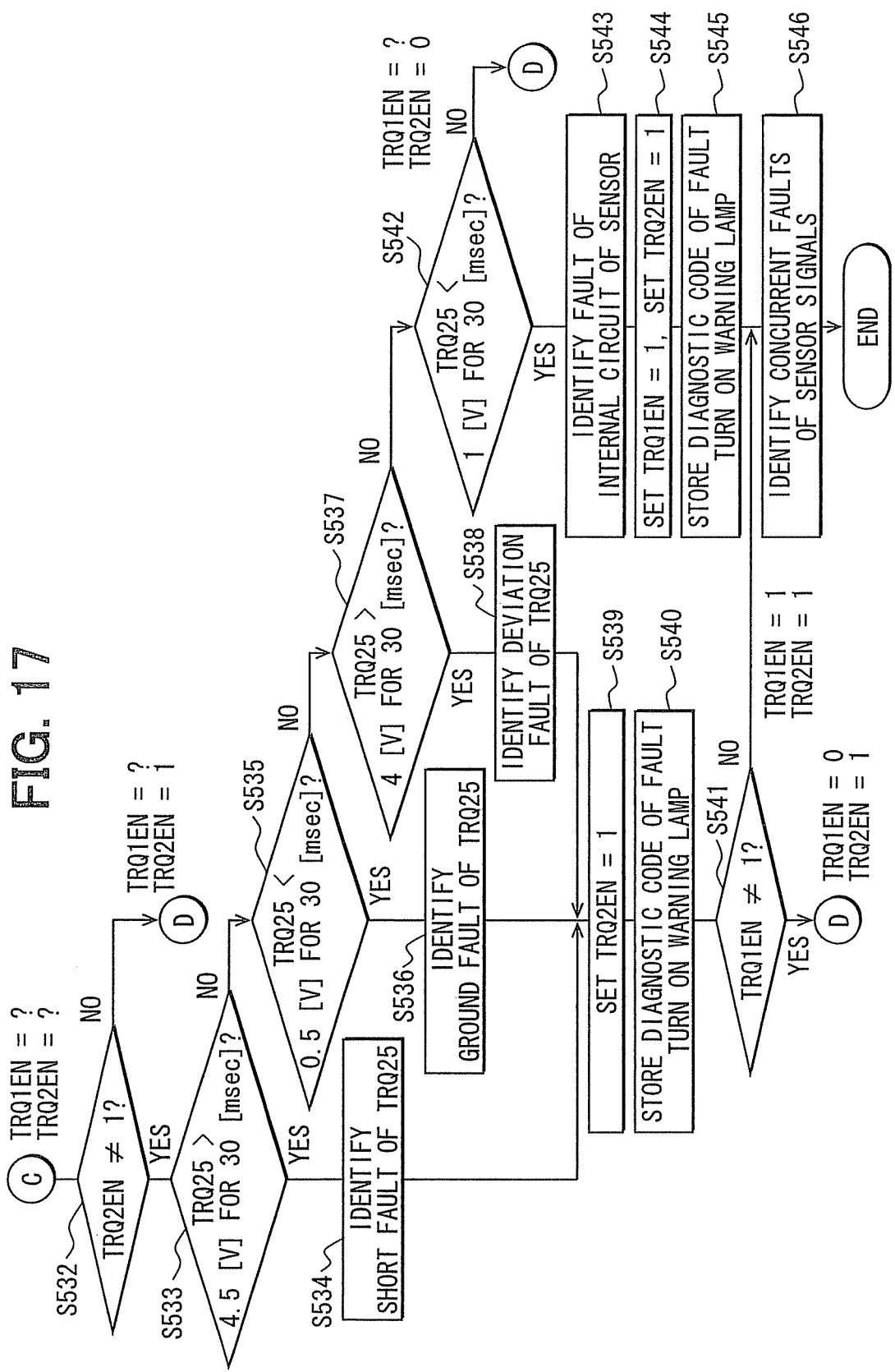
FIG. 17 is a flowchart showing the failure diagnosis in the first embodiment of the present disclosure.

As shown in FIG. 17, in S532 to which the process proceeds when negative determination is made in S517, positive determination is made in S526, or negative determination is made in S527, it is determined whether the prohibition flag TRQ2EN of the output signal TRQ25 is set, namely, whether TRQ2EN is not 1. When the prohibition flag TRQ2EN of the output signal TRQ25 has been set (S532: NO), i.e., when TRQ2EN is 1, the process proceeds to S547. When the prohibition flag TRQ2EN of the output signal TRQ25 is not set (S532: YES), namely, when TRQ2EN is not 1, i.e., TRQ2EN is 0, the process proceeds to S533.

In S533, it is determined whether the state where the output signal TRQ25 is greater than a short fault threshold (for example, 4.5 V) has continued for a predetermined time (for example, 30 msec). When it is determined that the state where the output signal TRQ25 is greater than the short fault threshold has not continued for the predetermined time (S533: NO), the process proceeds to S535. When it is determined that the state where the output signal TRQ25 is greater than the short fault threshold has continued for the predetermined time (S533: YES), the process proceeds to S534. In S534, the short fault is identified as having occurred in the output signal TRQ25, and the process proceeds to S539. Specifically, the short fault of the power supply line 64 coupled to the Hall IC 12 or the disconnection fault of the ground line 67 coupled to the Hall IC 12 is identified as having occurred.

In S535 to which the process proceeds when it is determined that the state where the output signal TRQ25 is greater than the short fault threshold has not continued for the predetermined time (S533: NO), it is determined whether the state where the output signal TRQ25 is less than a ground fault threshold (for example, 0.5 V) has continued for a predetermined time. When it is determined that the state where the output signal TRQ25 is less than the ground fault threshold has not continued for the predetermined time (S535: NO), the process proceeds to S537. When it is determined that the state where the output signal TRQ25 is less than the ground fault threshold has continued for the predetermined time (S535: YES), the process proceeds to S536. In S536, the ground fault is identified as having occurred in the output signal TRQ25, and the process proceeds to S539. Specifically, the disconnection fault of the power supply line 64 coupled to the Hall IC 12 or the short fault of the ground line 67 coupled to the Hall IC 12 is identified as having occurred.

In S537 to which the process proceeds when it is determined that the state where the output signal TRQ25 is less than the ground fault threshold has not continued for the predetermined time (S535: NO), it is determined whether the state where the output signal TRQ25 is greater than a torque signal deviation fault threshold (for example, 4 V) has continued for a predetermined time (for example, 30 msec). When it is determined that the state where the output signal TRQ25 is greater than the torque signal deviation fault threshold has not continued for the predetermined time or greater (S537: NO), the process proceeds to S542. When it is determined that the state the output signal TRQ25 is greater than the torque signal deviation fault threshold has continued for the predetermined time or greater (S537: YES), the process proceeds to S538. In S538, the deviation fault is identified as having occurred in the output signal TRQ25, and the process proceeds to S539.

In S539, it is determined that the output signal TRQ25 of the Hall IC 12 is prohibited from being used in the steering torque operation, and the prohibition flag TRQ2EN is set. That is, TRQ2EN is set to 1. In S540, a diagnostic code of the fault is stored and a warning lamp is turned on. In S541, it is determined whether the prohibition flag TRQ1EN of the output signal TRQ15 is set, namely, whether TRQ1EN is 1. When the prohibition flag TRQ1EN of the output signal TRQ15 is not set (S541: YES), namely, when TRQ1EN is not 1, i.e., TRQ1EN is 0, the process proceeds to S547. When the prohibition flag TRQ1EN of the output signal TRQ15 is set (S541: NO), i.e., when TRQ1EN is 1, the process proceeds to S546.

In S542 to which the process proceeds when it is determined that the state where the output signal TRQ25 is greater than the torque signal deviation fault threshold has not continued for the predetermined time or greater (S537: NO), it is determined whether the state where the output signal TRQ25 is less than a monitoring signal deviation fault threshold (for example, 1 V) has continued for a predetermined time (for example, 30 msec). When it is determined that the state where the output signal TRQ25 is less than the monitoring signal deviation fault threshold has not continued for the predetermined time or greater (S542: NO), the process proceeds to S547. When it is determined that the state where the output signal TRQ25 is less than the monitoring signal deviation fault threshold has continued for the predetermined time or greater (S542: YES), the process proceeds to S543.

In S543, the deviation fault is identified as having occurred in the monitoring signal TRQF which is identified as an internal circuit fault of the torque sensor 10. In S544, it is determined that the output signal TRQ15 of the Hall IC 11 and the output signal TRQ25 of the Hall IC 12 are both prohibited from being used in the steering torque calculation, and the prohibition flag is set. That is, TRQ1EN is set to 1 and TRQ2EN is set to 1. In S545, a diagnostic code of the fault is stored and a warning lamp is turned on. In S546, a sensor signal concurrent fault in which either the output signal TRQ15 or TRQ25 cannot be used is identified as having occurred, and the assistance processing for reducing steering torque is stopped.

In the present embodiment, the output signal TRQ13 or TRQ23 when abnormality has occurred in the torque signal TRQ11 or TRQ21 detected by the Hall IC 11 or Hall IC 12 is set to 4.3 V which is the second fault notification signal. Since the second fault notification signal is set to a value between the first upper limit and the second upper limit, a torque signal deviation fault threshold is set to 4 V here, which is the second upper limit. The output signal TRQ13 or TRQ23 when abnormality has occurred in the monitoring signal TRQF detected by the monitoring Hall IC 13 or when multiple faults have occurred is set to 0.7 V which is the first fault notification signal. Since the first fault notification signal is set between the first lower limit and the second lower limit, the monitoring signal deviation fault threshold is set to 1 V here, which is the second lower limit.

On the other hand, the output signal TRQ13 or TRQ23 when abnormality has occurred in the torque signal TRQ11 or TRQ21 detected by the Hall IC 11 or Hall IC 12 is set to 0.7 V which is the first fault notification signal. When the output signal TRQ13 or TRQ23 when abnormality has occurred in the monitoring signal TRQF detected by the monitoring Hall IC 13 or when multiple faults have occurred is set to 4.3 V which is the second fault notification signal, the torque signal deviation fault threshold is set to 1 V which is the second lower limit, and the monitoring signal deviation fault threshold is set to 4 V which is the second upper limit. Then, in S522 and S537, it is determined whether the state where the output signal TRQ15 or TRQ25 is less than 1 V which is the torque signal deviation fault threshold, has continued for the predetermined time or greater. In S527 and S542, it is determined whether the state where the output signal TRQ15 or TRQ25 is greater than 4 V which is the monitoring signal deviation fault threshold has continued for the predetermined time or greater.

Figure 18:
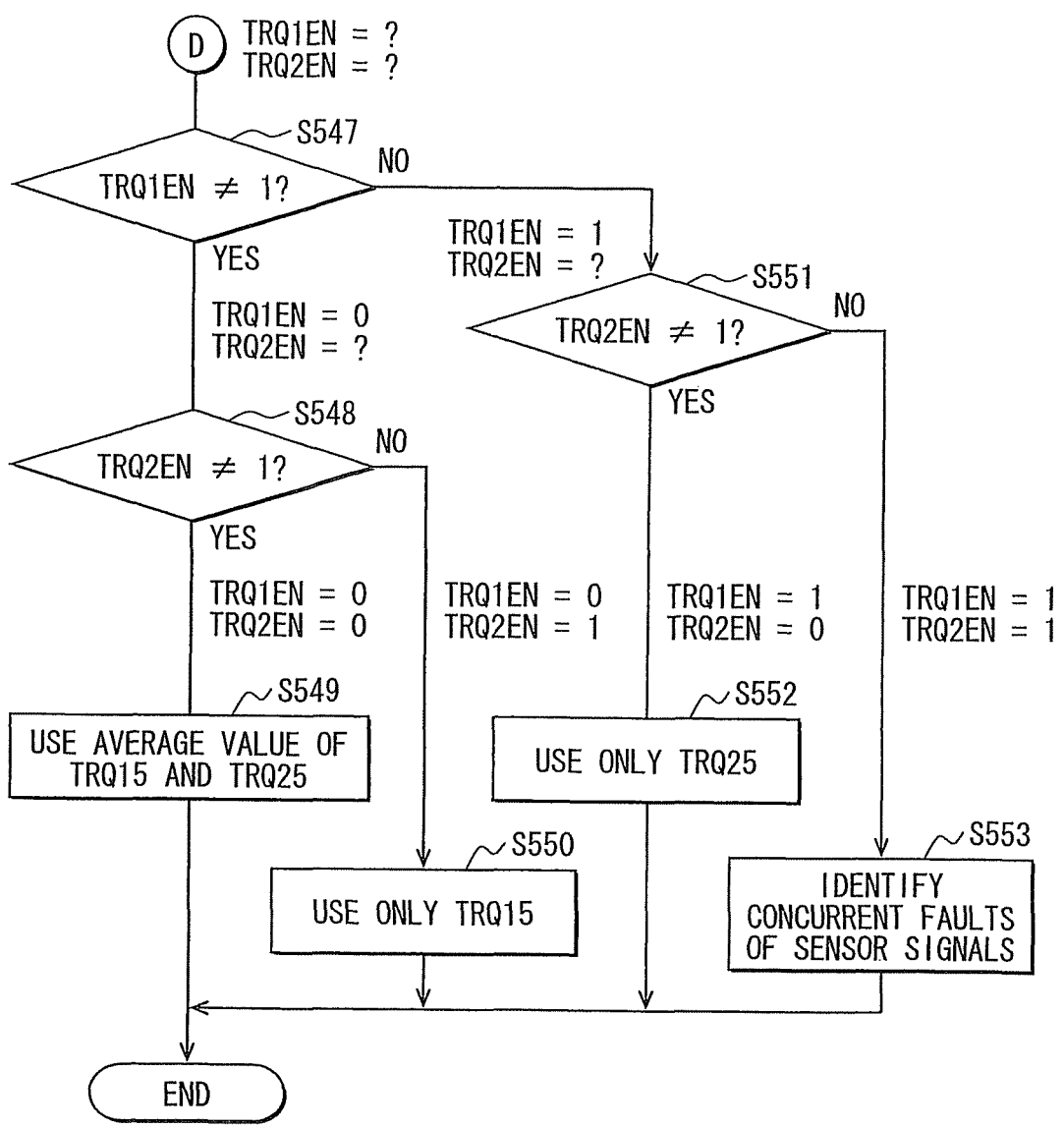
FIG. 18 is a flowchart showing the failure diagnosis in the first embodiment of the present disclosure.

As shown in FIG. 18, in S547 to which the process proceeds when negative determination is made in S532, when positive determination is made in S541, or when negative determination is made in S542, it is determined whether the prohibition flag TRQ1EN of the output signal TRQ15 is set, namely, whether TRQ1EN is not 1. When the prohibition flag TRQ1EN of the output signal TRQ15 is set (S547: NO), i.e., when TRQ1EN is 1, the process proceeds to S551. When the prohibition flag TRQ1EN of the output signal TRQ15 is not set (S547: YES), in other words, when TRQ1EN is not 1, i.e., TRQ1EN is 0, the process proceeds to S548.

In S548, it is determined whether the prohibition flag TRQ2EN of the output signal TRQ25 is set, namely, whether TRQ2EN is not 1. When the prohibition flag TRQ2EN of the output signal TRQ25 is set (S548: NO), i.e., when TRQ2EN is 1, the process proceeds to S550. When the prohibition flag TRQ2EN of the output signal TRQ25 is not set (S548: YES), namely, when TRQ2EN is not 1, i.e., TRQ2EN is 0, the process proceeds to S549.

In S549, since the prohibition flag TRQ1EN of the output signal TRQ15 and the prohibition flag TRQ2EN of output signal TRQ25 are not set, an amount of assist for reducing steering torque is calculated by use of an average value of the output signal TRQ15 and output signal TRQ25, and the assistance processing is continued.

In S550 to which the process proceeds when the prohibition flag TRQ1EN of the output signal TRQ15 is not set (S547: YES) and when the prohibition flag TRQ2EN of the output signal TRQ25 is set (S548: NO), in other words, when TRQ1EN is 0 and TRQ2EN is 1, an amount of assist for reducing steering torque is calculated using the output signal TRQ15 in which the prohibition flag is not set, and assistance processing is continued.

In S551 to which the process proceeds when the prohibition flag TRQ1EN of the output signal TRQ15 is set (S547: NO), it is determined whether the prohibition flag TRQ2EN of the output signal TRQ25 is set, namely, whether TRQ2EN is not 1. When the prohibition flag TRQ2EN of the output signal TRQ25 is set (S551: NO), i.e., when TRQ2EN is 1, the process proceeds to S553. When the prohibition flag TRQ2EN of the output signal TRQ25 is not set (S551: YES), that is, when TRQ2EN is not 1, i.e., TRQ2EN is 0, the process proceeds to S552.

In S552, since the prohibition flag TRQ1EN of the output signal TRQ15 is set (S547: NO), and the prohibition flag TRQ2EN of the output signal TRQ25 is not set (S551: YES), namely, TRQ1EN is 1 and TRQ2EN is 0, an amount of assist for reducing steering torque is calculated using the output signal TRQ25 in which the prohibition flag is not set, and assistance processing is continued.

When the prohibition flag TRQ1EN of the output signal TRQ15 and the prohibition flag TRQ2EN of the output signal TRQ25 are both set (S547: NO, S551: NO), namely, when TRQ1EN is 1 and TRQ2EN is 1, a sensor signal concurrent fault in which either the output signal TRQ15 or TRQ25 cannot be used is identified as having occurred, and the assistance processing for reducing steering torque is stopped.

As described above, the torque sensor 10 includes the Hall ICs 11 and 12, the monitoring Hall IC 13, the limiting circuit section 20, the first abnormality determination section 25, and the output section 40. The Hall ICs 11 and 12 detect the torque signals TRQ11 and TRQ21 which are responsive to torque and which are values between the first lower limit and the first upper limit. The monitoring Hall IC 13 detects the monitoring signal TRQF which is a signal for determining abnormality of the torque signals TRQ11 and TRQ21 and which is a value between the first lower limit and the first upper limit. In the voltage limiting circuit 21, when the torque signal TRQ11 is equal to or less than the second lower limit which is greater than the first lower limit (S104 in FIG. 6: YES), the torque signal TRQ12 is set to the second lower limit (S105). In the voltage limiting circuit 22, when the torque signal TRQ21 is equal to or less than the second lower limit which is greater than the first lower limit (S114 in FIG. 7: YES), the torque signal TRQ22 is set to the second lower limit (S115). In the voltage limiting circuit 21, when the torque signal TRQ11 is equal to or greater than the second upper limit which is less than the first upper limit (S102: YES), the torque signal TRQ12 is set to the second upper limit (S103). In the voltage limiting circuit 22, when the torque signal TRQ21 is equal to or greater than the second upper limit which is less than the first upper limit (S112: YES), the torque signal TRQ22 is set to the second upper limit (S103). The comparison circuit 26 determines whether abnormality has occurred in the torque signal TRQ11 based on the torque signal TRQ11 and monitoring signal TRQF (S203 in FIG. 8). The comparison circuit 27 determines whether abnormality has occurred in the torque signal TRQ21 based on the torque signal TRQ21 and monitoring signal TRQF (S213 in FIG. 9). In the output section 40, the output signals TRQ13 and TRQ23 corresponding to the torque signal TRQ11 of the Hall IC 11 and the torque signal TRQ21 of the Hall IC 12 are transmitted to the control unit 50. In the output section 40, when abnormality has not occurred in the torque signal TRQ11 or TRQ21, the output signals TRQ13 and TRQ23 are set to the normal signals TRQ12 and TRQ22 which are values based on the torque signals TRQ11 and TRQ21 and which are values between the second lower limit and the second upper limit. When abnormality has occurred in the torque signal TRQ11, the fault logic circuit 41 transmits, as the output signal TRQ13, the second fault notification signal 4.3V which is the value between the first upper limit and the second upper limit. When abnormality has occurred in the torque signal TRQ21, the fault logic circuit 41 transmits, as the output signal TRQ23, the second fault notification signal 4.3 V, which is the value between the first upper limit and the second upper limit.

This provides the following advantageous effects. (1) In the present embodiment, abnormality of the torque signals TRQ11 and TRQ21 can be appropriately determined based on the signals transmitted from the output section 40. Since the normal signal and the second fault notification signal are transmitted as the output signals TRQ13 and TRQ23 corresponding to the Hall ICs 11 and 12, it may be unnecessary to separately provide a structure of, e.g., signal lines for detecting the abnormality of the torque signals TRQ11 and TRQ21.

Figure 10:
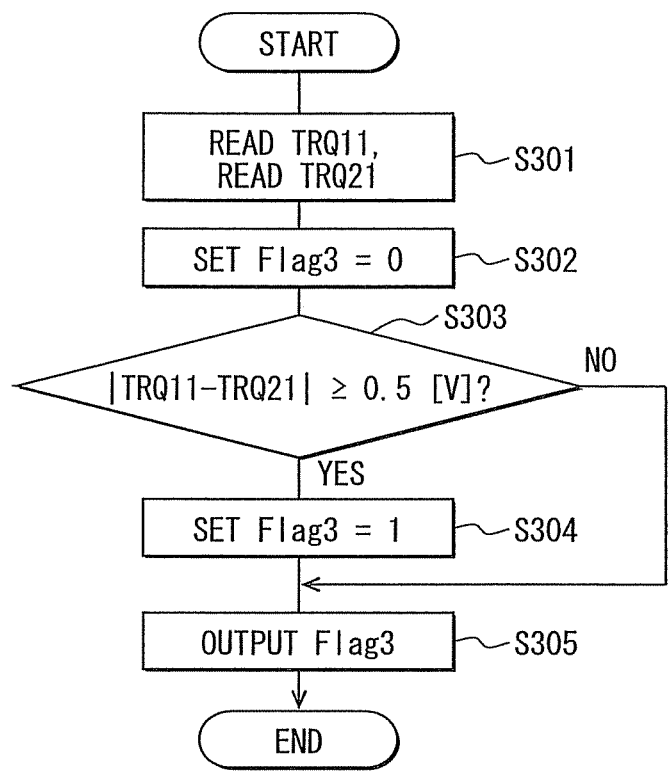
FIG. 10 is a flowchart showing a comparison determination in the first embodiment of the present disclosure.

(2) In the comparison circuit 31, it is determined whether abnormality has occurred in the torque signals TRQ11 and TRQ21 based on the torque signals TRQ11 and TRQ21 (S303 in FIG. 10). In the fault logic circuit 41, when it is determined that abnormality has occurred in the torque signals TRQ11 and TRQ21 in the first abnormality determination section 25 (in FIG. 11, S402: NO, S402: NO) and when it is determined that abnormality has not occurred in the torque signal TRQ11 and TRQ21 in the second abnormality determination section 30 (S413: YES), abnormality is identified as having occurred in the monitoring signal TRQF. Accordingly, abnormality of the monitoring signal TRQF can be identified without increasing a structure of signal lines etc.

(3) When abnormality has occurred in the torque signal TRQ11 (S410: NO), the output section 40 transmits the second fault notification signal 4.3 V as the output signal TRQ13 (S412). When abnormality has occurred in the torque signal TRQ21 (S406: NO), the output section 40 transmits the second fault notification signal 4.3 V as the output signal TRQ23 (S408). When it is determined that abnormality has occurred in the monitoring signal TRQF (S413: YES), the output section 40 transmits the first fault notification signal 0.7 V as the output signal TRQ13 or TRQ23 instead of at least one of the normal signals (torque signal) TRQ11 and TRQ21. Accordingly, it can be identified whether abnormality of the torque signal TRQ11 or TRQ21 has occurred or abnormality of the monitoring signal TRQF has occurred. As a result, identification of a fault location becomes easy, early component fault analysis becomes possible, and product quality is improved.

(4) In the output section 40, when it is determined that abnormality has not occurred in the torque signal TRQ11 or TRQ21 in the first abnormality determination section 25 (S402: YES, S403: YES) and when it is determined that abnormality has occurred in the torque signal TRQ11 in the second abnormality determination section 30 (S404: NO), the output signals TRQ13 and TRQ23 are set to the torque signals TRQ12 and TRQ22 which are the normal signals. Additionally, in the output section 40, when it is determined that abnormality has occurred in the torque signal TRQ11 in the first abnormality determination section 25 (S402: NO) and when it is determined that abnormality has not occurred in the torque signal TRQ11 in the second abnormality determination section 30 (S410: YES), the output signal TRQ13 is set to the torque signal TRQ12 which is the normal signal. Additionally, the output section 40, when it is determined in the first abnormality determination section 25 that abnormality has occurred in the torque signal TRQ21 (S403: NO) and when it is determined in the second abnormality determination section 30 that abnormality has not occurred in the torque signal TRQ21 (S406: YES), sets the output signal TRQ23 to the torque signal TRQ22 which is the normal signal.

When abnormality has occurred in the torque signal TRQ11, it is determined in the comparison circuit 26 and comparison circuit 31 that the abnormality has occurred, and the abnormality flags Flag1 and Flag3 would be set. When abnormality has occurred in the torque signal TRQ21, it is determined in the comparison circuit 27 and comparison circuit 31 that the abnormality has occurred, and the abnormality flags Flag2 and Flag3 would be set. However, due to a circuit characteristic etc., a time difference may be generated from the time when it is determined that abnormality has occurred until the time when the abnormality flags Flag1 to Flag3 are set. Then, in the present embodiment, until the abnormality flag Flag1 to be set in the comparison circuit 26 and the abnormality flag Flag3 to be set in the comparison circuit 31 are set or until the abnormality flag Flag2 to be set in the comparison circuit 27 and the abnormality flag Flag3 to be set in the comparison circuit 31 are set, the occurrence of abnormality is not determined. Thus, false determination can be avoided.

(5) When it is determined in the first abnormality determination section 25 that abnormality has occurred in all the torque signals TRQ11 and TRQ21 (S402: NO, S409: NO) and when it is determined in the second abnormality determination section 30 that abnormality has occurred in the torque signal TRQ11 and TRQ21 (S413: NO), the output section 40 transmits the first fault notification signal 0.7 V as the output signals TRQ13 and TRQ23 corresponding to the Hall ICs 11 and 12 (S415). As a result, also when multiple faults occur, abnormality can be detected certainly. In the present embodiment, since the torque sensor 10 is applied to the electric power steering device 100, assistance processing can be stopped when accurate steering torque may be undetectable, which contributes to improvement in safety.

(6) The torque detector 60 includes the torque sensor 10, the control unit 50, the signal lines 61 and 62, the power supply lines 63 and 64 from the control unit 50 to the torque sensor 10, and the ground lines 66 and 67 from the control unit 50 to the torque sensor 10. In the control unit 50, a signal transmitted from the output section 40 is acquired (S502 in FIG. 14) to identify a fault based on the acquired signal (S504 and S506; S510 and S512 in FIG. 15; S519, S521, S523, and S528 in FIG. 16; and S534, S536, S538, and S543 in FIG. 17). The internal power sources 56 and 57 supply electric power to the torque sensor 10. The signals transmitted from the output section 40 are transmitted to the control unit 50 via the signal lines 61 and 62. Accordingly, a fault location can be appropriately identified in the control unit 50.

(7) In the control unit 50, when the output signal TRQ15 to which the output signal TRQ13 is ND converted is the second fault notification signal 4.3 V (S522: YES), a failure of the Hall IC 11 corresponding to the output signal TRQ15 is identified (S523). When the output signal TRQ25 to which the output signal TRQ23 is ND converted is the second fault notification signal 4.3 V (S537: YES), a fault of the Hall IC 12 corresponding to the output signal TRQ25 is identified (S538). Further, when the output signal TRQ15 or output signal TRQ25 is the first fault notification signal 0.7 V (S527: YES or S542: YES), a failure of the monitoring Hall IC 13 related to abnormality determination of the torque signals TRQ13 and TRQ23 corresponding to the output signals TRQ15 and TRQ25 is identified (S528, S543). As a result, a fault location in the torque sensor 10 can be identified appropriately.

(8) In the control unit 50, when the output signal TRQ15 to which the output signal TRQ13 is ND converted is greater than the short fault threshold which is a value greater than the second fault notification signal (S518: YES), a short fault of the power supply line 63 coupled to the Hall IC 11 or a short fault which is a disconnection fault of the ground line 66 coupled to Hall IC 11, is identified (S519). When the output signal TRQ25 to which the output signal TRQ23 is ND converted is greater than the short fault threshold which is a value greater than the second fault notification signal (S532: YES), a short fault of the power supply line 64 coupled to the Hall IC 12 or a short fault which is a disconnection fault of the ground line 67 coupled to the Hall IC 12, is identified (S534)

In the control unit 50, when the output signal TRQ15 to which the output signal TRQ13 is ND converted is less than the ground fault threshold which is a value less than the first fault notification signal (S520: YES), a disconnection fault of the power supply line 63 coupled to the Hall IC 11 or a ground fault, which is a short fault of the ground line 66 coupled to the Hall IC 11, is identified (S521). When the output signal TRQ25 to which the output signal TRQ23 is A/D converted is less than the ground fault threshold which is a value less than the first fault notification signal (S535: YES), a disconnection fault of the power supply line 64 coupled to the Hall IC 12 or a ground fault which is a short fault of the ground line 67 coupled to the Hall IC 12 is identified (S536). Accordingly, since the faults of the Hall ICs 11 and 12 or monitoring Hall IC 13, the short fault, and the ground fault can be stratified, the short faults or disconnection faults of the power supply lines 63 and 64 and ground lines 66 and 67 can be identified appropriately. In the present embodiment, the predetermined value is 0.5 V. The predetermined value can be set suitably less than a difference between the first lower limit and the first fault notification signal or a difference between the first upper limit and the second fault notification signal.

(9) In the present embodiment, multiple power supply lines 63, multiple power supply lines 64, multiple ground lines 66, and multiple ground lines 67 are provided. As a result, torque detection can be continued when at least one power supply line and one ground line are normal even in the event of disconnection etc. of some of the power supply lines or ground lines.

(10) The power supply lines 63 and 64 are provided as many as the Hall ICs 11 and 12 or greater, and the ground lines 66 and 67 are provided as many as the Hall ICs 11 and 12 or greater. The power supply line 63 and ground line 66 are provided to the Hall IC 11. The power supply line 64 and ground line 67 are provided to the Hall IC 12. Accordingly, the Hall IC 12 is independent of the power supply line 63 and ground line 66, and the Hall IC 11 is independent of the power supply line 64 and ground line 67. Even when disconnection etc. occurs in some of the power supply lines or ground lines, torque detection can be continued using the Hall IC coupled to the power supply lines or ground lines in which disconnection etc. has not occurred.

In the present embodiment, the torque sensor 10 and control unit 50 are coupled by two signal lines, two power supply lines, and two ground lines. In such a structure, even in the event of a fault of disconnection etc. in the power supply line or ground line, torque detection can be continued while the number of the lines which connect the torque sensor 10 and control unit 50 is the same as that in the case where the torque sensor 10 and control unit 50 are coupled by four signal lines, one power supply line, and one ground line. This can improve safety.

(11) The internal power sources 56 and 57 are provided to the Hall IC 11 and 12, respectively. As a result, torque detection can be continued even when abnormality occurs in one of the internal power sources 56 and 57.

(12) The monitoring Hall IC 13 is coupled to the power supply line 63 provided to the Hall IC 11 and to the power supply line 64 provided to the Hall IC 12 via diodes 572 and 573. The monitoring Hall IC 13 is coupled to the ground line 66 provided to the Hall IC 11 and the ground line 67 provided to the Hall IC 13 via diodes 576 and 577. Thus, even when abnormality occurs in some of the power supply lines 63 and 64, ground lines 66 and 67, or internal power sources 56 and 57, abnormality detection in the torque sensor 10 can be continued. Since it may be unnecessary to separately provide a power supply line and a ground line to the monitoring Hall IC 13, increase of components can be controlled and cost can be reduced.

(13) In the present embodiment, the torque detector 60 including the torque sensor 10 is applied to the electric power steering device 100. The control unit 50 acquires the output signals TRQ13 and TRQ23 transmitted from the output section 40 (S502 in FIG. 14), and calculates an amount of assist for reducing steering torque based on the acquired output signals TRQ13 and TRQ15 (S549, S550, S552 in FIG. 18). In the present embodiment, since the torque detector 60 capable of determining abnormality of the torque signals TRQ11 and TRQ12 appropriately is used for the electric power steering device 100, safety is improved.

(14) In the control unit 50, an amount of assist is calculated based on the output signals TRQ13 and TRQ23 which are the normal signals TRQ12 and TRQ22 (S549, S550, S552). As a result, the amount of assist can be appropriately calculated using the normal signals based on the torque signals in which abnormality has not occurred.

(15) In the control unit 50, when there are no output signals TRQ13 and TRQ23 which are the normal signals TRQ12 and TRQ22, the assistance processing for reducing steering torque is stopped (S516, S531, S546, S553). This improves safety because the assistance processing is stopped when there is a possibility that accurate steering torque cannot be calculated.

(16) In the control unit 50, when the output signals TRQ15 and TRQ25 to which the output signals TRQ13 and TRQ23 are A/D converted are values without a range from the second lower limit to the second upper limit (S503: YES, S505: YES, S509: YES, S511: YES, S518: YES, S520: YES, S552: YES, S527: YES, S533: YES, S535: YES, S537: YES, or S542: YES), a warning lamp is turned on to notify a driver of abnormality occurred in the torque detector 60 (S508, S514, S525, S529, S540, or S544). As a result, regardless of whether the assistance processing is continued, a driver can be appropriately notified of abnormality occurred in the torque detector 60, which improves safety.

In the present embodiment, the Hall ICs 11 and 12 can operate as "torque signal detection sections," the monitoring Hall IC 13 can operate as a "monitoring signal detection section," the limiting circuit section 20 can operate as a "limiting section," the first abnormality determination section 25 can operate as a "abnormality determination section," the second abnormality determination section 30 can operate as a "self-determination section," and the output section 40 can operate as an "output section" and a "monitoring signal abnormality identification section." The control unit 50 can operate as a "signal acquisition section," a "fault identification section," a "calculation section," a "stop section," and a "notification section." The internal power sources 56 and 57 can operate as "power circuit section."

Figure 6:
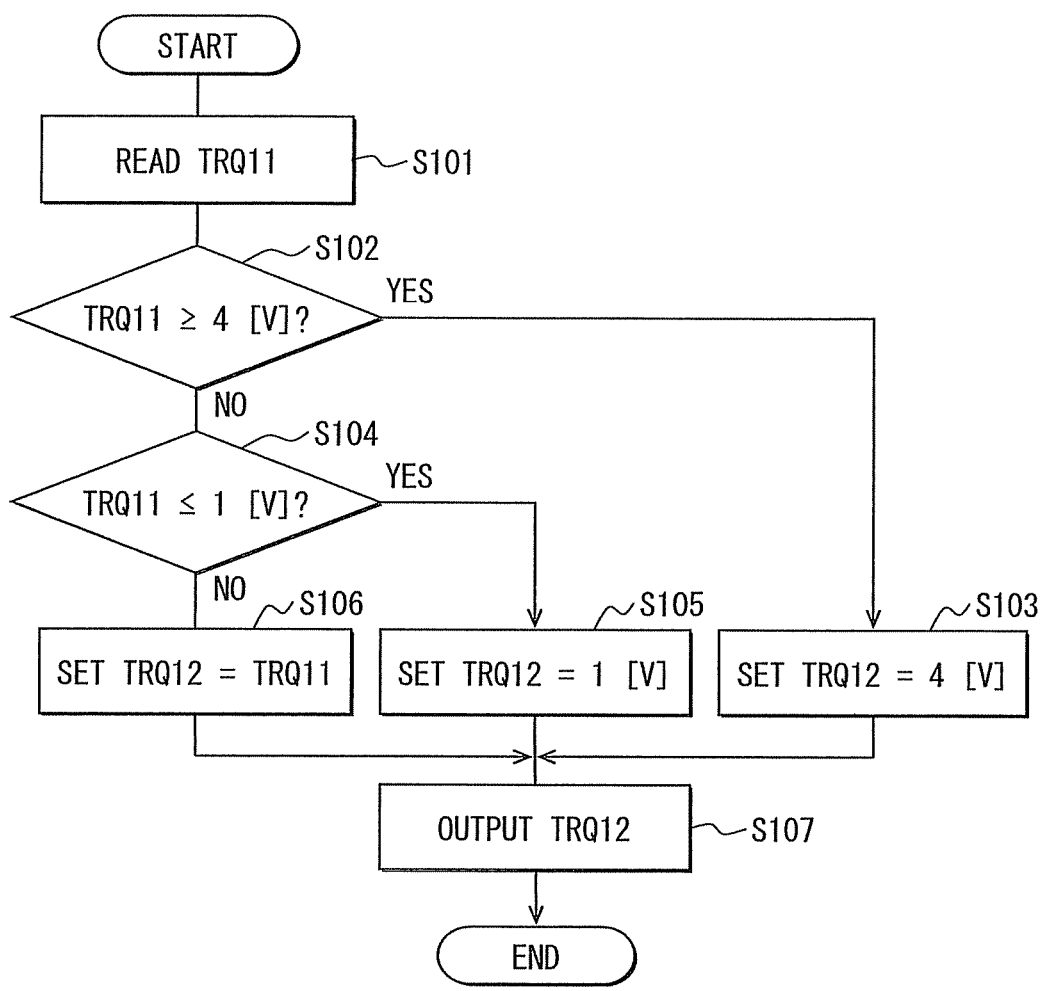
FIG. 6 is a flowchart showing a restriction of the upper and lower limits in the first embodiment of the present disclosure.
Figure 7:
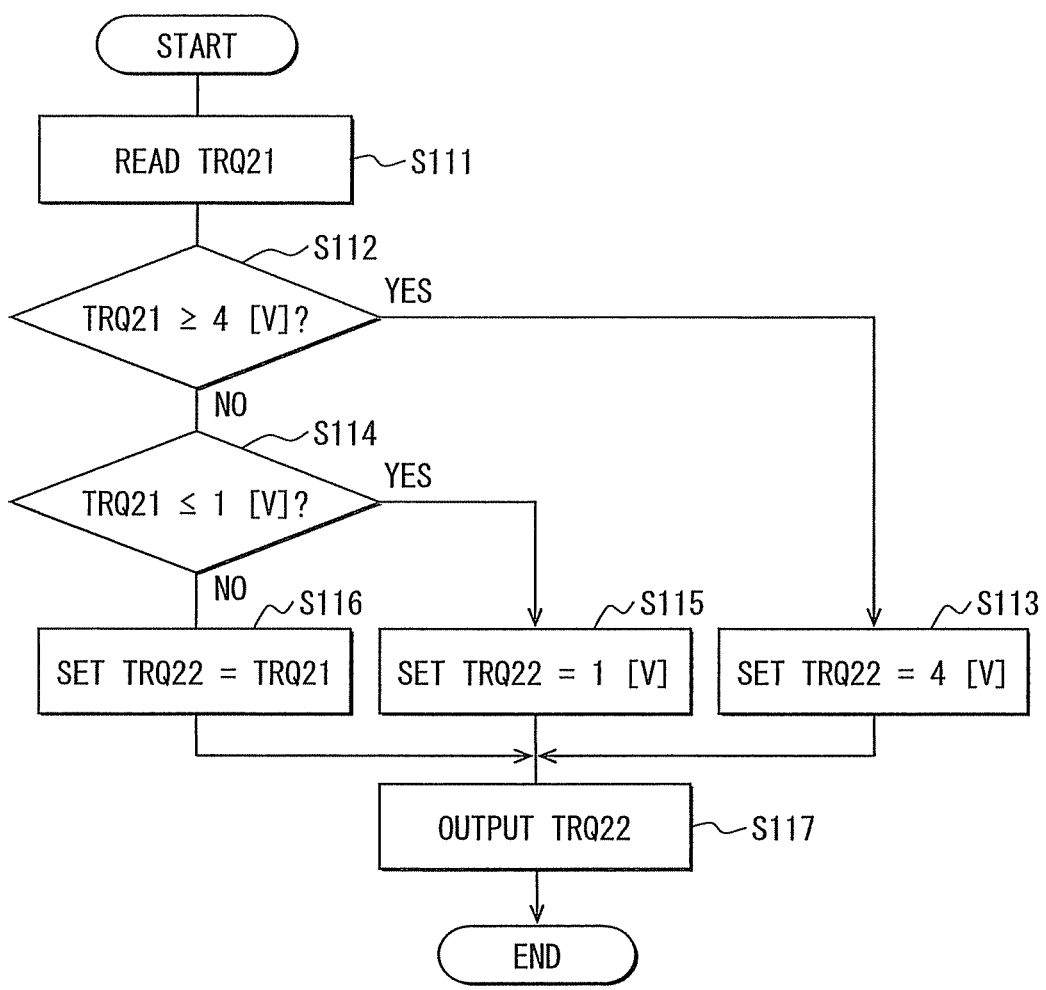
FIG. 7 is a flowchart showing the restriction of the upper and lower limits in the first embodiment of the present disclosure.
Figure 8:
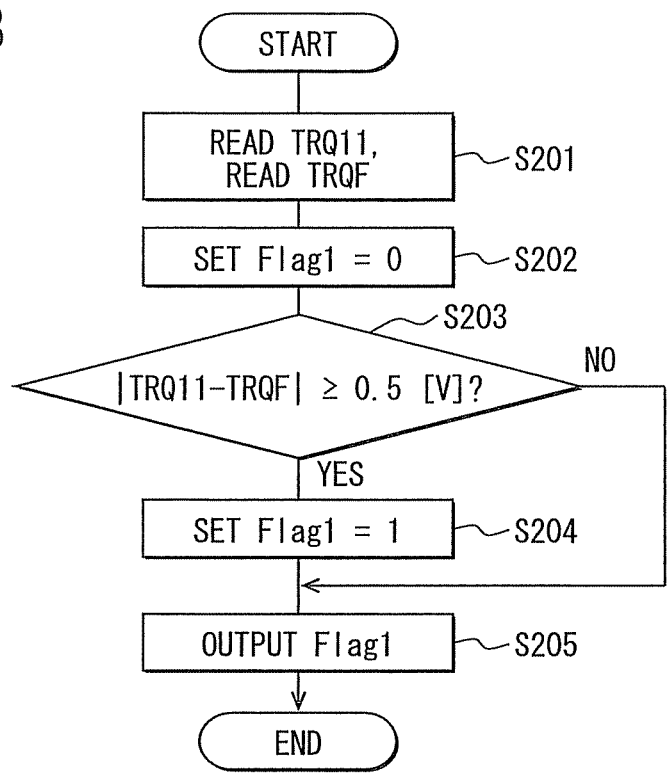
FIG. 8 is a flowchart showing a comparison determination in the first embodiment of the present disclosure.
Figure 9:
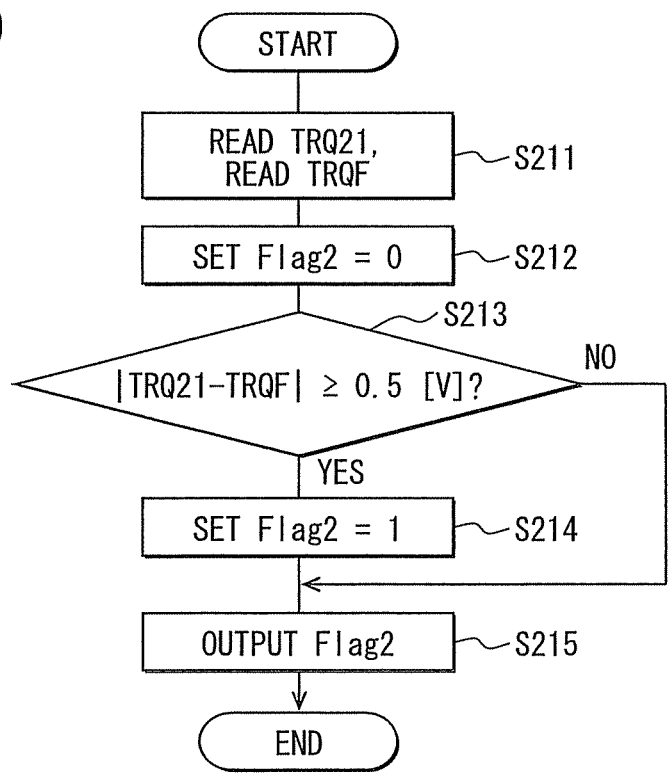
FIG. 9 is a flowchart showing a comparison determination in the first embodiment of the present disclosure.

The processing of S103, 5105 in FIGS. 6 and 5113, 5115 in FIG. 7 corresponds to the processing of the "limiting section." The processing of S203 in FIG. 8 and S213 in FIG. 9 corresponds to the processing of the "abnormality determination section." The processing of S303 in FIG. 10 corresponds to the processing of the "self-determination section." The processing of S414 in FIG. 11 corresponds to the processing of the "monitoring signal abnormality identification section." The processing of S405, 5407, S408, 5411, 5412, S414, and 5415 corresponds to the processing of the "output section." The processing of S502 in FIGS. 14 to 18 corresponds to the processing of the "signal acquisition section." The processing of S504, 5506, 5510, 5512, 5519, 5521, S523, 5528, 5534, 5536, S538, and 5543 corresponds to the processing of the "fault identification section." The processing of S549, S550, and S552 corresponds to the processing of the "calculation section." The processing of S516, S531, S546, and S553 corresponds to the processing of the "stop section." The processing of S508, S514, S525, S529, S540, and S544 corresponds to the processing of the "notification section."

Second Embodiment

Figure 19:
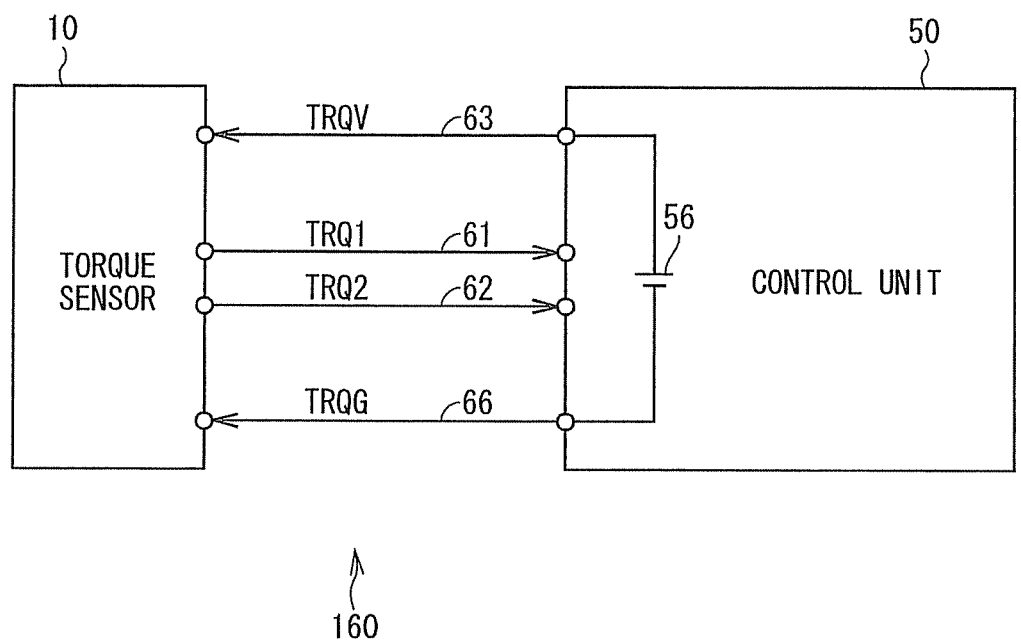
FIG. 19 is a block diagram showing a torque detector according to a second embodiment of the present disclosure.
Figure 20:
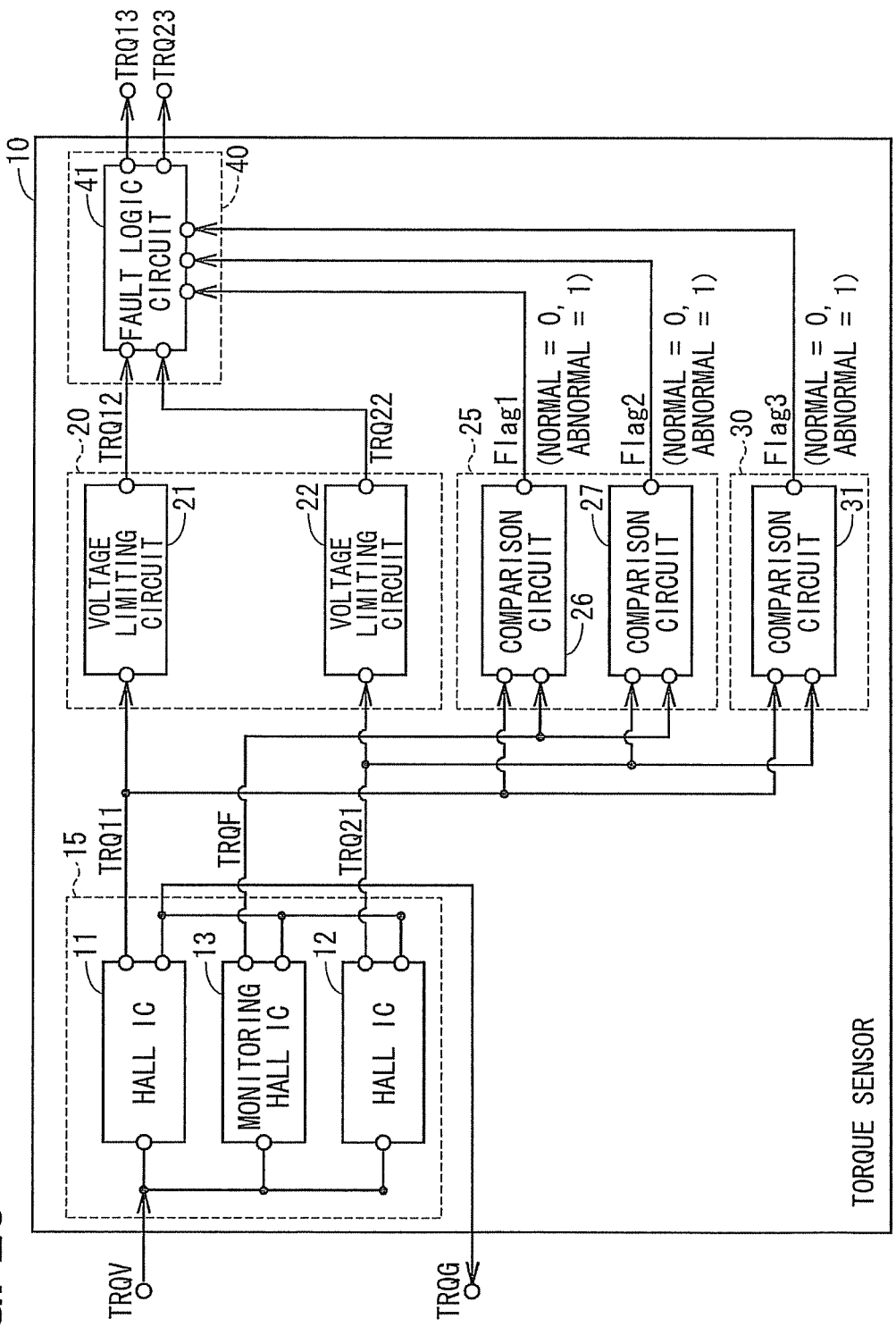
FIG. 20 is a block diagram showing a torque sensor according to the second embodiment of the present disclosure.

The torque sensor 10 and a torque detector 160 according to a second embodiment of the present disclosure will be described with reference to FIGS. 19 and 20. Since the connection relationship between the torque sensor 10 and control unit 50 differs between the present embodiment and the first embodiment, the difference is mainly described and the other components are not described. In the present embodiment, one internal power source 56 is provided to the control unit 50, and the internal power source 56, the Hall ICs 11 and 12, and the monitoring Hall IC 13 are coupled by the power supply line 63 and ground line 66. Accordingly, electric power is supplied from the internal power source 56 to the Hall ICs 11 and 12 and monitoring Hall IC 13.

Also in the present embodiment, the output signals TRQ15, TRQ25, and a TRQV are read in S502 in FIG. 14, and in each processing in FIG. 14, TRQV is used instead of the battery signal TRQV1. The processing of the flowchart shown in FIG. 15 is omitted. With respect to this, the third embodiment to the fifth embodiment are similar to the second embodiment.

This provides the same advantageous effects as above-mentioned (1) to (8) and (13) to (16).

(17) In the present embodiment, since the lines for connecting the torque sensor 10 and control unit 50 include a total of four lines: two signal lines; one power supply line; and one ground line. Thus, the number of components can be reduced as compared with in the first embodiment. Additionally, abnormality of the torque signals TRQ11 and TRQ21 can be appropriately determined by the simple structure without changing the structure of the terminals etc. of the control unit 50.

Third Embodiment

Figure 21:
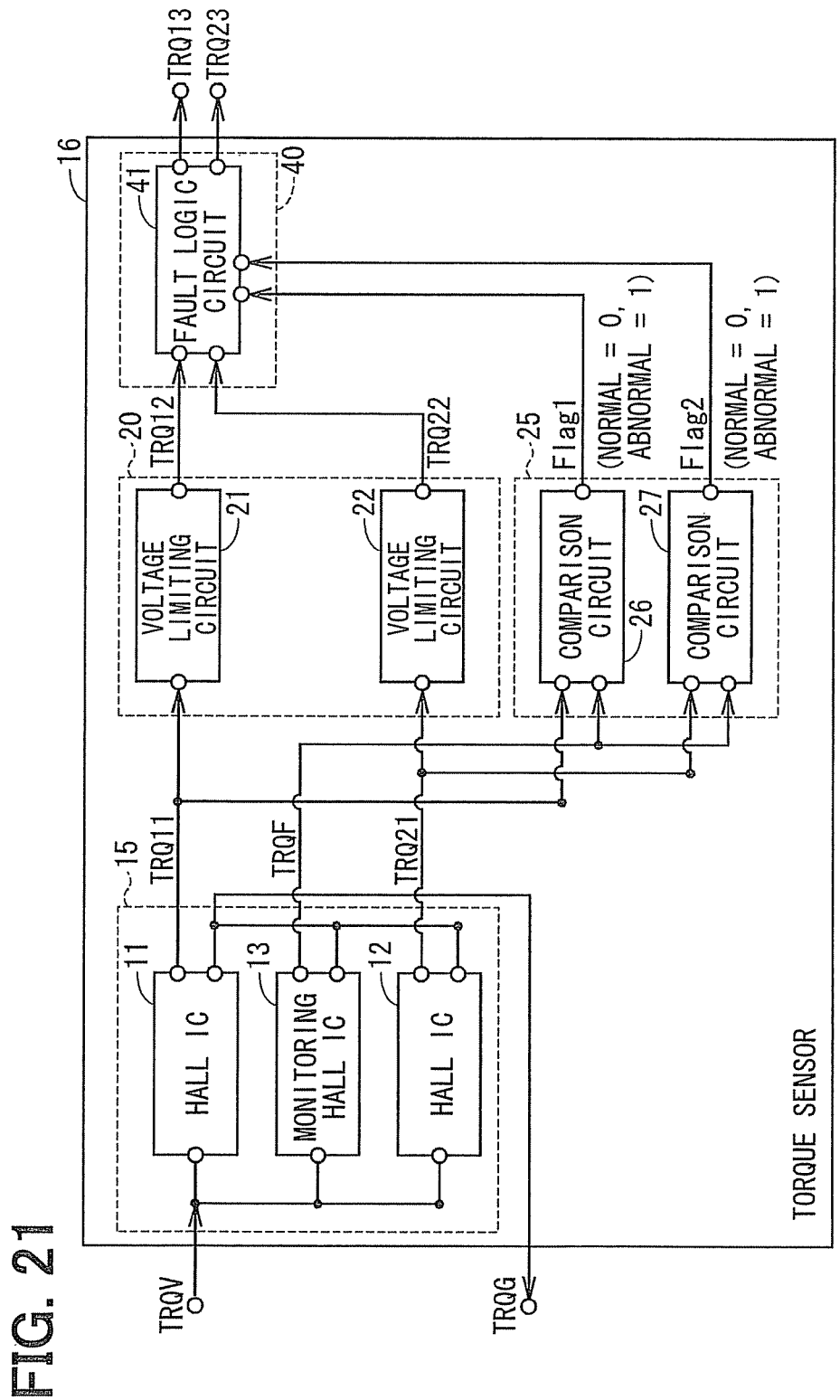
FIG. 21 is a block diagram showing a torque sensor according to a third embodiment of the present disclosure.

A torque sensor 16 according to a third embodiment of the present disclosure will be described with reference to FIG. 21. In the torque sensor 16 of the present embodiment, the control unit 50 includes one internal power source 56 as in the second embodiment. This internal power source 56, the Hall ICs 11 and 12, and the monitoring Hall IC 13 are coupled by the power supply line 63 and ground line 66. Accordingly, electric power is supplied from the internal power source 56 to the Hall ICs 11 and 12 and the monitoring Hall IC 13 (See FIG. 19). Unlike in the first embodiment and second embodiment, the second abnormality determination section 30 is not provided in the present embodiment. Therefore, in the present embodiment, the comparison determination shown in FIG. 10 is not performed.

Referring to the output signal identification shown in FIG. 11, in the present embodiment, the torque signals TRQ12 and TRQ22 and the abnormality flags Flag1 and Flag2 are read in S401. When the processing of S404 is omitted and positive determination is made in S403, the process proceeds to S405. When the processing of S406 and S407 is omitted and negative determination is made in S403, the process proceeds to S408. Similarly, when the processing of S410 and S411 is omitted and negative determination is made in S410, the process proceeds to S412. Further, the processing of S413 to S415 is omitted.

Here, the determination result in the fault logic circuit 41 in the present embodiment is shown in FIG. 22. As shown in FIG. 22A, when the abnormality flag Flag1 is 1 and the abnormality flag Flag2 is 0, it is determined that abnormality of the torque signal TRQ11 detected by Hall IC 11 has occurred. The output signal TRQ13 is set to 4.3 V which is the second fault notification signal, and the output signal TRQ23 is set to TRQ22 which is the normal signal. When the abnormality flag Flag1 is 0 and the abnormality flag Flag2 is 1, it is determined that abnormality of the torque signal TRQ12 detected by the Hall IC 12 has occurred. The output signal TRQ13 is set to TRQ12 which is the normal signal, and the output signal TRQ23 is set to 4.3 V which is the second fault notification signal.

When the abnormality flag Flag1 is 0 and the abnormality flag Flag2 is 0, it is determined that the torque signal TRQ11 detected by Hall IC 11 and the torque signal TRQ21 detected by the Hall IC 12 are normal. The output signal TRQ13 is set to TRQ12 which is the normal signal, and the output signal TRQ23 is set to TRQ22 which is the normal signal.

As shown in FIG. 22B, instead of 4.3V which is the second fault notification signal, 0.7 V which is the first fault notification signal may be used as the output signal corresponding to the torque signal determined to be abnormal.

This provides the same advantageous effects as the above (1), (6) to (8), and (13) to (17). In the present embodiment, since the second abnormality determination section 30 is not provided, abnormality of the torque signals TRQ11 and TRQ21 can be appropriately determined by the simpler structure and processing.

Fourth Embodiment

A torque sensor 17 according to a fourth embodiment of the present disclosure will be described with reference to FIG. 23. This embodiment is a modification of the third embodiment. In the present embodiment, the monitoring Hall IC is provided to each Hall IC. That is, the monitoring Hall IC 13 is provided to the Hall IC 11, and the monitoring Hall IC 14 is provided to the Hall IC 12. The monitoring Hall ICs 13 and 14 are configured similarly to the Hall ICs 11 and 12. When the Hall ICs 11 and 12 and the monitoring Hall ICs 13 and 14 are all normal, the torque signals TRQ11 and TRQ12, a monitoring signal TRQF1 detected by the monitoring Hall IC 13, and a monitoring signal TRQF2 detected by the monitoring Hall IC 14 are the same value.

The first abnormality determination section 25 has a comparison circuit 28 and a comparison circuit 29. The comparison circuit 28 compares the torque signal TRQ11 with the monitoring signal TRQF1. In the present embodiment, the Hall IC 11 and monitoring Hall IC 13 are configured similarly, and when both are normal, the torque signal TRQ11 and monitoring signal TRQF1 are the same value. Then, a value of the torque signal TRQ11 is compared with a value of the monitoring signal TRQF1 in the comparison circuit 26. When the values are different, the abnormality flag Flag1 is set, and Flag1=1 is transmitted to the output section 40. When the torque signal TRQ11 and monitoring signal TRQF1 are equal, the abnormality flag Flag1 is not set, and Flag1=0 is transmitted to the output section 40. The comparison circuit 29 compares the torque signal TRQ21 with the monitoring signal TRQF2. In the present embodiment, the Hall IC 12 and monitoring Hall IC 14 are configured similarly, and when both are normal, the torque signal TRQ21 and monitoring signal TRQF2 are the same value. Then, in the comparison circuit 29, a value of the torque signal TRQ21 is compared with a value of the monitoring signal TRQF2, and when the values are different, the abnormality flag Flag2 is set, and Flag2=1 is transmitted to the output section 40. When the torque signal TRQ21 and monitoring signal TRQF2 are equal, the abnormality flag Flag2 is not set, and Flag2=0 is transmitted to the output section 40.

The comparison determination performed in the comparison circuit 28 is generally the same as that of the flowchart shown in FIG. 8, and the monitoring signal TRQF1 is used instead of the monitoring signal TRQF. The comparison determination performed in the comparison circuit 29 is generally the same as that of the flowchart shown in FIG. 9, and the monitoring signal TRQF2 is used instead of the monitoring signal TRQF. This provides the same advantageous effects as the above (1), (6) to (8), and (13) to (17).

Fifth Embodiment

Figure 24:
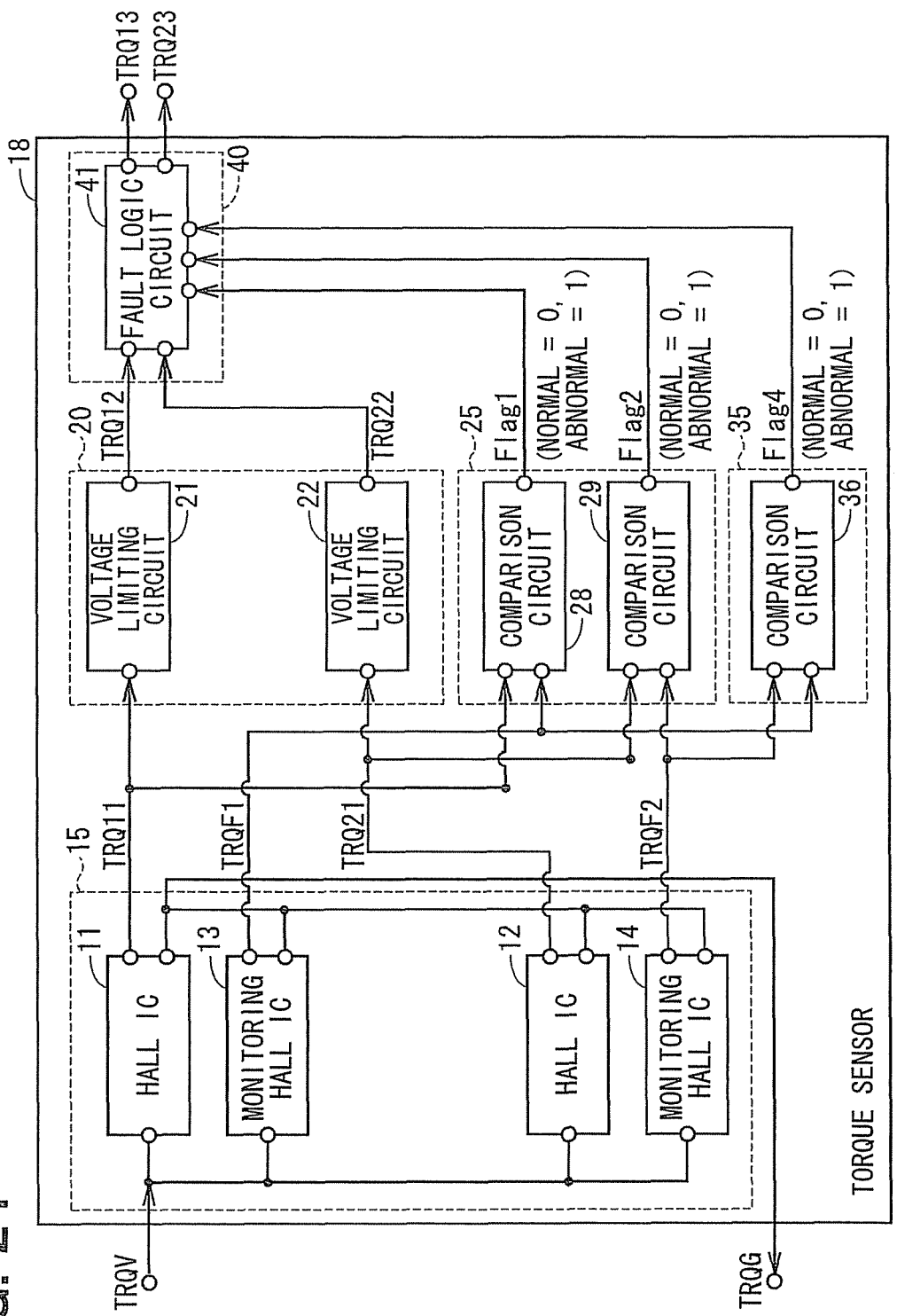
FIG. 24 is a block diagram showing a torque sensor according to a fifth embodiment of the present disclosure.

A torque sensor 18 according to a fifth embodiment of the present disclosure will be described with reference to FIG. 24. As shown in FIG. 24, in addition to the structure of the torque sensor 17 of the fourth embodiment, the torque sensor 18 of the present embodiment has a monitoring signal abnormality determination section 35. The comparison determination performed in the comparison circuit 28 is generally the same as that of the flowchart shown in FIG. 8 as in the fourth embodiment, and the monitoring signal TRQF1 is used instead of the monitoring signal TRQF. The comparison determination performed in the comparison circuit 29 is generally the same as that of the flowchart shown in FIG. 9, and the monitoring signal TRQF2 is used instead of the monitoring signal TRQF.

The monitoring signal abnormality determination section 35 has a monitoring signal abnormality determination circuit 36. In the monitoring signal abnormality determination circuit 36, the monitoring signal TRQF1 is compared with the monitoring signal TRQF2. In the present embodiment, the monitoring Hall ICs 13 and 14 are configured similarly, and when both are normal, the monitoring signals TRQF1 and TRQF2 are the same value. Then, in the monitoring signal abnormality determination circuit 36, values of the monitoring signals TRQF1 and TRQF2 are compared. When the values are different, an abnormality flag Flag4 is set to show that the monitoring signal TRQF1 or TRQF2 is abnormal, and the abnormality flag Flag4 is transmitted to the output section 40. When the monitoring signals TRQF1 and TRQF2 are equal, the abnormality flag Flag4 is not set, and Flag4=0 is transmitted to the output section 40.

Here, the comparison determination performed in the monitoring signal abnormality determination circuit 36 will be described with reference to the flowchart shown in FIG. 25. In S351, the monitoring signals TRQF1 and TRQF2 are read. In S352, the abnormality flag Flag4 is reset, and Flag4=0 (normal) is set.

In S353, it is determined whether an absolute value of the difference between the monitoring signal TRQF1 and monitoring signal TRQF2 is a determination threshold or greater. The determination threshold here is set to 0.5 V. When it is determined that the absolute value of the difference between the monitoring signal TRQF1 and monitoring signal TRQF2 is less than the determination threshold (S353: NO), the process proceeds to S355. When it is determined that the absolute value of the difference of the monitoring signal TRQF1 and monitoring signal TRQF2 is the determination threshold or greater (S353: YES), the process proceeds to S354. In S354, the abnormality flag Flag4 is set, and Flag4=1 (abnormal) is set. In S355, the abnormality flag Flag4 is transmitted to the output section 40.

Then, the output signal identification performed in the fault logic circuit 41 will be described with reference to the flowchart shown in FIG. 26. In S451, the torque signals TRQ12 and TRQ22 transmitted from the limiting circuit section 20, the abnormality flags Flag1 and Flag2 transmitted from the first abnormality determination section 25, and the abnormality flag Flag4 transmitted from the monitoring signal abnormality determination section 35 are read. In S452, it is determined whether the abnormality flag Flag1 is 0 (normal). When it is determined that the abnormality flag Flag1 is not 0 (S452: NO), i.e., when the abnormality flag Flag1 is 1, the process proceeds to S459. When it is determined that the abnormality flag Flag1 is 0 (S452: YES), the process proceeds to S453.

In S453, it is determined whether the abnormality flag Flag2 is 0 (normal). When it is determined that the abnormality flag Flag2 is not 0 (S453: NO), i.e., when the abnormality flag Flag2 is 1, the process proceeds to S456. When it is determined that the abnormality flag Flag2 is 0 (S453: YES), the process proceeds to S454. In S454, it is determined whether the abnormality flag Flag4 is 0 (normal). When it is determined that the abnormality flag Flag4 is 0, the process proceeds to S455.

In S455, since the torque signals TRQ11 and TRQ12 detected by the Hall IC 11 and the monitoring Hall ICs 13 and 14 are all normal, the output signal TRQ13 corresponding to the torque signal TRQ11 detected by the Hall IC 11 is set to the torque signal TRQ12 which is a value based on the torque signal TRQ11 and which is transmitted from the limiting circuit section 20. The output signal TRQ23 corresponding to the torque signal TRQ21 detected by the Hall IC 12 is set to the torque signal TRQ22 which is a value based on the torque signal TRQ21 and which is transmitted from the limiting circuit section 20.

In S454, when it is determined that the abnormality flag Flag4 is not 0 (S454: NO), namely, when the abnormality flag Flag4 is 1, abnormality may have occurred in the monitoring signal TRQF1 or TRQF2. The abnormality flags Flag1 and Flag2 transmitted from the first abnormality determination section 25 are both 0 (normal) (S452: YES, S453: YES). To avoid a false determination that abnormality has occurred, the process proceeds to S455. Then, the output signal TRQ13 is set to the torque signal TRQ12 and the output signal TRQ23 is set to the torque signal TRQ22.

In S456 to which the process proceeds when it is determined that the abnormality flag Flag1 is 0 and the abnormality flag Flag2 is 1 (S452: YES, S453: NO), it is determined whether the abnormality flag Flag4 is 0 (normal). When it is determined that the abnormality flag Flag4 is not 0 (S456: NO), i.e., when the abnormality flag Flag4 is 1, the process proceeds to S458. When it is determined that the abnormality flag Flag4 is 0 (S456: YES), the process proceeds to S457.

In S457, it is determined that abnormality has occurred in the torque signal TRQ21 detected by the Hall IC 12. Then, the output signal TRQ23 is set to 4.3 V which is the second fault notification signal between the first upper limit and the second upper limit as a signal showing that abnormality has occurred in the torque signal.

In S458 to which the process proceeds when it is determined that the abnormality flag Flag2 is 1 and the abnormality flag Flag4 is 1 (S453: NO, S456: NO), it is determined that abnormality has occurred in the monitoring signal TRQF2 detected by the monitoring Hall IC 14. Then, the output signal TRQ23 corresponding to the Hall IC 12 provided corresponding to the monitoring Hall IC 14 is set to 0.7 V which is the first fault notification signal between the first lower limit and the second lower limit as a signal showing that abnormality has occurred in the monitoring signal.

In S459 to which the process proceeds when it is determined that the abnormality flag Flag1 is not 0 (S451: NO), it is determined whether the abnormality flag Flag2 is 0 (normal). When it is determined that the abnormality flag Flag2 is not 0 (S459: NO), i.e., when the abnormality flag Flag2 is 1, the process proceeds to S463. When it is determined that the abnormality flag Flag2 is 0 (S459: YES), the process proceeds to S460.

In S460, it is determined whether the abnormality flag Flag4 is 0 (normal). When it is determined that the abnormality flag Flag4 is not 0 (S460: NO), i.e., when the abnormality flag Flag4 is 1, the process proceeds to S462. When it is determined that the abnormality flag Flag4 is 0 (S460: YES), the process proceeds to S461.

In S461, it is determined that abnormality has occurred in the torque signal TRQ11 detected by the Hall IC 11. Then, the output signal TRQ13 is set to 4.3 V which is the second fault notification signal between the first upper limit and the second upper limit as a signal showing that abnormality has occurred in the torque signal.

In S462 to which the process proceeds when it is determined that the abnormality flag Flag1 is 1 and the abnormality flag Flag4 is 1 (S452: NO, S460: NO), it is determined that abnormality has occurred in the monitoring signal TRQF1 detected by the monitoring Hall IC 13. Then, the output signal TRQ13 corresponding to the Hall IC 11 provided corresponding to the monitoring Hall IC 13 is set to 0.7 V which is the first fault notification signal between the first lower limit and the second lower limit as a signal showing that abnormality has occurred in the monitoring signal.

In S463 to which the process proceeds when it is determined that the abnormality flag Flag2 is not 0 (S459: NO), it is determined whether the abnormality flag Flag4 is 0 (normal). When it is determined that the abnormality flag Flag4 is not 0 (S463: NO), i.e., when the abnormality flag Flag4 is 1, the process proceeds to S465. When it is determined that the abnormality flag Flag4 is 0 (S463: YES), the process proceeds to S464.

In S464, it is determined that abnormality has occurred in the torque signal TRQ11 detected by the Hall IC 11 and the torque signal TRQ21 detected by the Hall IC 12. Since a double fault has occurred, the output signal TRQ13 corresponding to the torque signal TRQ11 and the output signal TRQ23 corresponding to the torque signal TRQ21 are set to 0.7 V which is the first fault notification signal.

It is determined that multiple faults have occurred when it is determined that the abnormality flag Flag1 is 1, the abnormality flag Flag2 is 1, and the abnormality flag Flag4 is 1 (S452: NO, S459: NO, S463: NO). Then, the output signals TRQ13 and TRQ23 are set to 0.7V which is the first fault notification signal as signals showing that abnormality has occurred.

Figure 26:
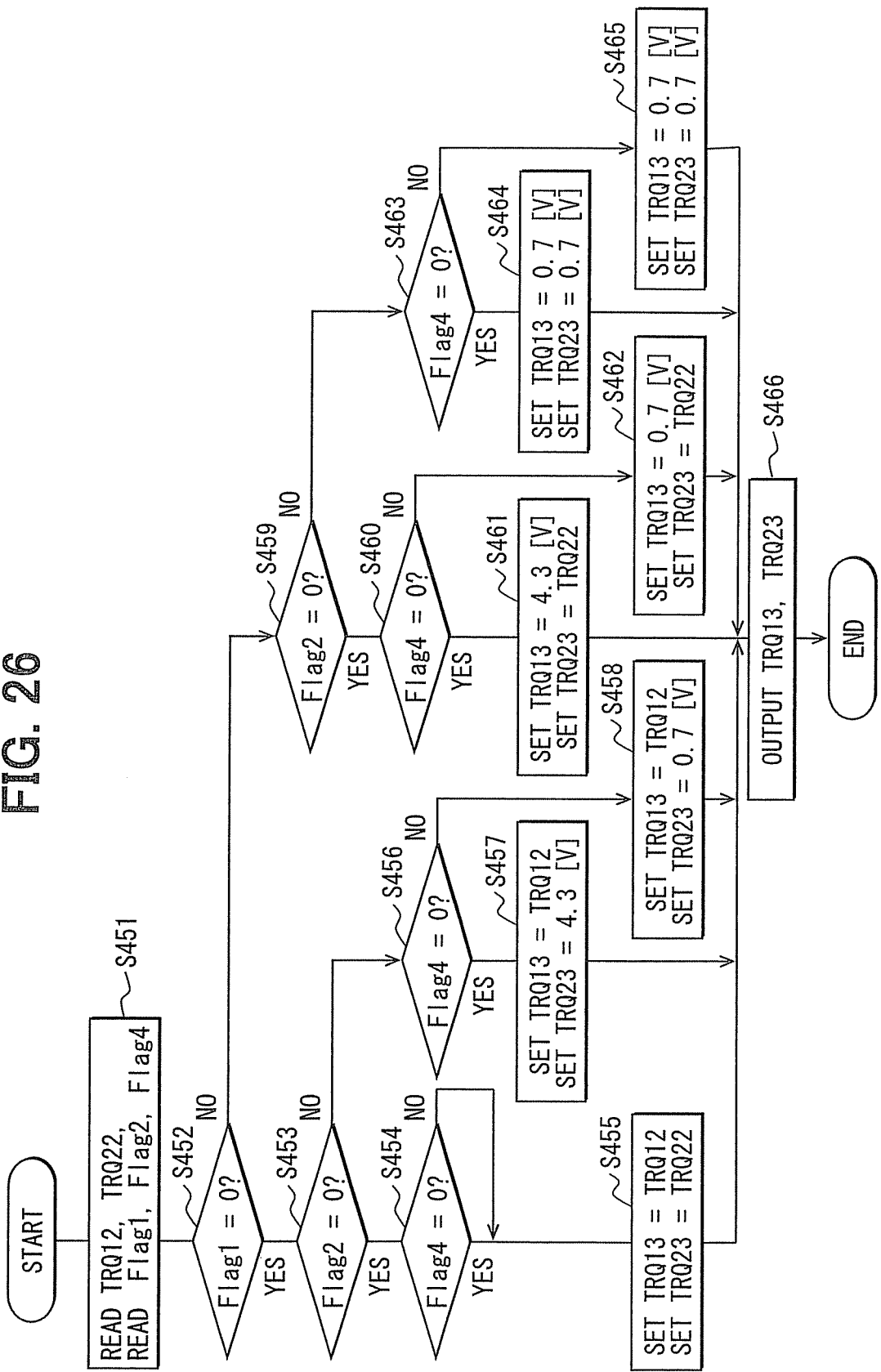
FIG. 26 is a flowchart showing an identification of output signals according to the fifth embodiment of the present disclosure.

Here, the determination result in the fault logic circuit 41 explained in reference to the flowchart shown in FIG. 26 is shown in FIG. 27. As shown in FIG. 27, when the abnormality flag Flag1 is 1, the abnormality flag Flag2 is 0, and the abnormality flag Flag4 is 1 (S452: NO, S459: YES, S460: YES in FIG. 26), it is determined that abnormality of the torque signal TRQ11 detected by the Hall IC 11 has occurred. The output signal TRQ13 is set to 4.3 V which is the second fault notification signal, and the output signal TRQ23 is set to TRQ22 which is the normal signal.

When the abnormality flag Flag1 is 0, the abnormality flag Flag2 is 1, and the abnormality flag Flag4 is 0 (S452: YES, S453: NO, S456: YES), it is determined that abnormality of the torque signal TRQ21 detected by the Hall IC 12 has occurred. The output signal TRQ13 is set to TRQ12 which is the normal signal, and the output signal TRQ23 is set to 4.3 V which is the second fault notification signal.

When the abnormality flag Flag1 is 1, the abnormality flag Flag2 is 0, and the abnormality flag Flag4 is 1 (S452: NO, S459: YES, S460: NO), it is determined that abnormality of the monitoring signal TRQF1 detected by the monitoring Hall IC 13 has occurred. The output signal TRQ13 corresponding to the Hall IC 11 provided corresponding to the monitoring Hall IC 13 is set to 0.7 V which is the first fault notification signal, and the output signal TRQ23 is set to TRQ22 which is the normal signal.

When the abnormality flag Flag1 is 0, the abnormality flag Flag2 is 1, and the abnormality flag Flag4 is 1 (S452: YES, S453: NO, S456: NO), it is determined that abnormality of the monitoring signal TRQF2 detected by the monitoring Hall IC 14 has occurred. The output signal TRQ23 corresponding to the Hall IC 12 provided corresponding to the monitoring Hall IC 14 is set to 0.7 V which is the second fault notification signal, and the output signal TRQ13 is set to TRQ12 which is the normal signal.

In the present embodiment, when abnormality has occurred in the monitoring signal detected by the monitoring Hall IC 13 or monitoring Hall IC 14, the abnormality flag Flag1 or Flag2 and the abnormality flags Flag4 are set. A difference in the determination time may be generated due to a circuit characteristic etc. Only the abnormality flag Flag4 may be set (S452: YES, S453: YES, S454: NO). In this case, abnormality may have occurred in the monitoring signal TRQF1 or TRQF2. To avoid a false determination that abnormality has occurred, the output signals TRQ13 and TRQ23 are respectively set to TRQ12 and TRQ22 which are both normal signals. The determination result in which the normal signal is transmitted to avoid a false determination although abnormality may have occurred is described as "temporarily normal" in FIG. 27.

Further, when the abnormality flag Flag1 is 1, the abnormality flag Flag2 is 1, and the abnormality flag Flag4 is 0 (S452: NO, S459: NO, S463: YES), a double fault has occurred. Therefore, the output signals TRQ13 and TRQ23 are set to 0.7 V which is the first fault notification signal. At least one of the output signals TRQ13 and TRQ23 output here may be set to 4.3 V which is the second fault notification signal. In FIG. 27, the determination result is described as "temporarily abnormal."

When all the abnormality flags Flag1, Flag2, and Flag4 are 1 (S452: NO, S459: NO, S463: NO), multiple faults have occurred. Thus, the output signals TRQ13 and TRQ23 are set to 0.7 V which is the first fault notification signal. At least one of the output signals TRQ13 and TRQ23 output here may be set to 4.3 V which is the second fault notification signal. When all the abnormality flags Flag1, Flag2, and Flag3 are 0, the Hall ICs 12 and 13 and the monitoring Hall ICs 13 and 14 are all normal. Thus, the output signals TRQ13 and TRQ23 are set to TRQ12 and TRQ22 which are both normal signals.

In the present embodiment, as shown in FIG. 27 and FIG. 28A, when abnormality has occurred in the torque signal TRQ11 and TRQ21 detected by the Hall ICs 11 and 12, the output signal TRQ13 or TRQ23 is set to 4.3 V which is the second fault notification signal. When abnormality has occurred in the monitoring signals TRQF1 and TRQF2 detected by the monitoring Hall ICs 13 and 14, the output signals TRQ13 and TRQ23 are set to 0.7 V which is the first fault notification signal.

As shown in FIG. 28B, when abnormality has occurred in the torque signals TRQ11 and TRQ21 detected by the Hall ICs 11 and 12, the output signal TRQ13 or TRQ23 is set to 0.7 V which is the first fault notification signal. When abnormality has occurred in the monitoring signals TRQF1 and TRQF2 detected by the monitoring Hall ICs 13 and 14, the output signals TRQ13 and TRQ23 may be set to 4.3 V which is the second fault notification signal. In FIGS. 28A and 28B, the temporarily normal case and the case of the multiple faults are omitted, and FIG. 28A corresponds to FIG. 27.

In the present embodiment, multiple monitoring Hall ICs are provided. On the basis of the monitoring signals TRQF1 and TRQF2, it is determined whether abnormality has occurred in the monitoring signals TRQF1 and TRQF2 (S353 in FIG. 25). As a result, it can be determined appropriately whether abnormality has occurred in the monitoring signals TRQF1 and TRQF2.

The monitoring Hall IC 13 is provided corresponding to the Hall IC 11, and the monitoring Hall IC 14 is provided corresponding to the Hall IC 12. In the present embodiment, based on the torque signal TRQ11 detected by the correspondingly provided Hall IC 11 and on the monitoring signal TRQF1 detected by the monitoring Hall IC 13, it is determined whether abnormality has occurred in the torque signal TRQ11 (S203 in FIG. 8). In addition, based on the torque signal TRQ21 detected by the correspondingly provided Hall IC 12 and on the monitoring signal TRQF2 detected by the monitoring Hall IC 14, it is determined whether abnormality has occurred in the torque signal TRQ21 (S213 in FIG. 9).

When it is determined that abnormality has occurred in the torque signal TRQ11 (S452: NO) and when it is determined that abnormality has occurred in the monitoring signal TRQF1 or TRQF2 (S460: NO), it is determined that abnormality has occurred in the monitoring signal TRQF1 detected by the monitoring Hall IC 13 provided corresponding to the Hall IC 11 that has detected the torque signal TRQ11 determined to be abnormal (S462). When it is determined that abnormality has occurred in the torque signal TRQ21 (S453: NO) and when it is determined that abnormality has occurred in the monitoring signal TRQF1 or TRQF2 (S456: NO), it is identified that abnormality has occurred in the monitoring signal TRQF2 detected by the monitoring Hall IC 14 provided corresponding to the Hall IC12 that has detected the torque signal TRQ21 determined to be abnormal (S458). Accordingly, even when multiple monitoring Hall ICs are provided, a fault location can be identified appropriately. As a result, early component fault analysis becomes possible and product quality is improved.

When abnormality has occurred in the torque signal TRQ11, the output section 40 transmits the second fault notification signal 4.3 V as the output signal TRQ13 (S461), and when abnormality has occurred in the torque signal TRQ21, the output section 40 transmits the second fault notification signal 4.3 V as the output signal TRQ23. When it is identified that abnormality has occurred in the monitoring signal TRQF1, the output section 40 transmits the first fault notification signal 0.7 V as the output signal TRQ13 corresponding to the Hall IC 11 provided corresponding to the monitoring Hall IC 13 that has detected the monitoring signal TRQF1 identified to be abnormal (S462). When it is identified that abnormality has occurred in the monitoring signal TRQF2, the output section 40 transmits the second fault notification signal 0.7 V as the output signal TRQ23 corresponding to the Hall IC 12 provided corresponding to the monitoring Hall IC 14 that has detected the monitoring signal TRQF2 identified to be abnormal (S458). As a result, even when multiple monitoring Hall ICs are provided, a fault location can be identified appropriately without providing the structure of signal lines etc. separately. In addition, early section fault analysis becomes possible and product quality is improved.

When it is determined that abnormality has not occurred in the torque signal TRQ11 or TRQ21 (S452: YES, S453: YES) and that abnormality has occurred in the monitoring signal TRQF1 or TRQF2 (S454: NO), the output section 40 transmits the TRQ12 which is the normal signal as the output signal TRQ13, and transmits the output TRQ22 which is the normal signal as the output signal TRQ23 (S455). As a result, even in the event of abnormality occurred in the monitoring signal TRQF1 or TRQF2, the torque detection can be continued by outputting the normal signal when the torque signals TRQ11 and TRQ12 are normal. Even when a time difference is generated in the determination of abnormality due to a circuit characteristic, a false determination that abnormality has occurred can be prevented.

When it is determined that abnormality has occurred in multiple torque signals TRQ11 and TRQ21 (S452: NO, S459: NO), the output section 40 transmits the second fault notification signal 0.7 V as the output signals TRQ13 and TRQ23 corresponding to all the Hall ICs 11 and 12. As a result, also when multiple faults occur, abnormality can be detected certainly. Additionally, that provides the same advantageous effects as the above (1), (6) to (8), and (13) to (17).

In the present embodiment, the Hall ICs 12 and 13 can operate as the "torque signal detection section," the monitoring Hall ICs 13 and 14 can operate as the "monitoring signal detection section," the limiting circuit section 20 can operate as the "limiting section," the first abnormality determination section 25 can operate as the "abnormality determination section," the monitoring signal abnormality determination section 35 can operate as a "monitoring signal abnormality determination section," and the output section 40 can operate as the "output section" and the "monitoring signal abnormality location identification section."

Figure 25:
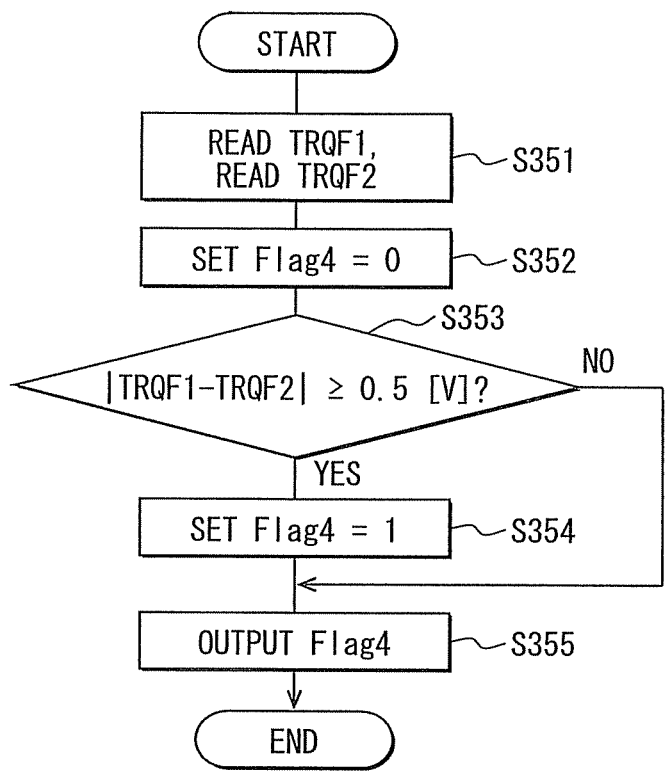
FIG. 25 is a flowchart showing a comparison determination in the fifth embodiment of the present disclosure.

The processing of S103, S105 in FIG. 6 and S113, S115 in FIG. 7 corresponds to the processing of the "limiting section." The processing of S203 in FIG. 8 and S213 in FIG. 9 corresponds to the processing of the "abnormality determination section." The processing of S353 in FIG. 25 corresponds to the processing of the "monitoring signal abnormality determination section." The processing of S458 and S462 in FIG. 26 corresponds to the processing of the "monitoring signal abnormality location identification section." The processing of S455, S457, S458, S461, S462, S464, and S465 corresponds to the processing of the "output section." The section configured by the control unit 50 is the same as that of the first embodiment.

Sixth Embodiment

Figure 29:
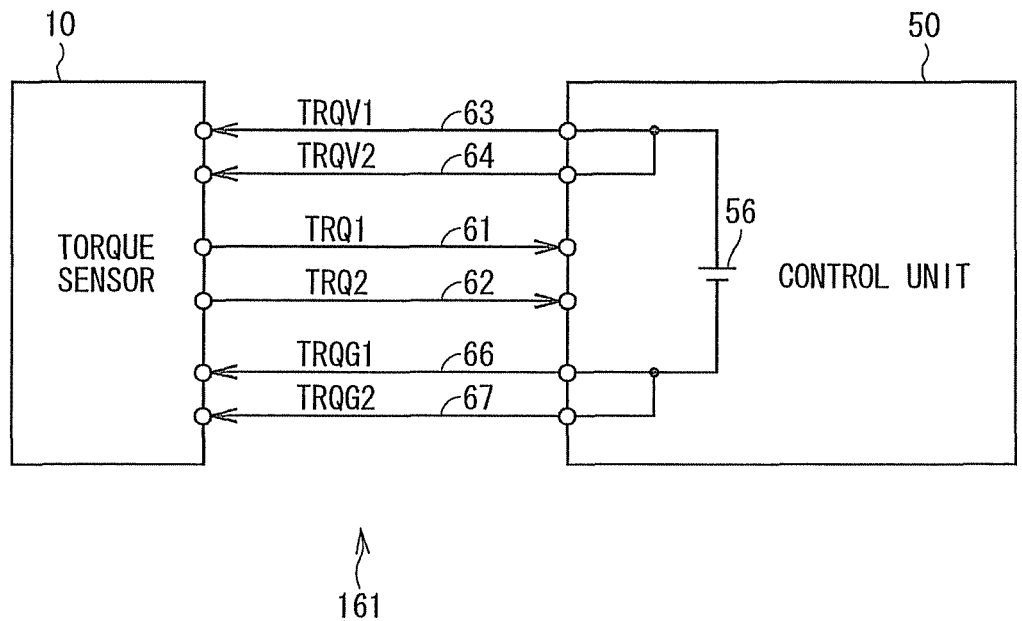
FIG. 29 is a block diagram showing a torque detector according to a sixth embodiment of the present disclosure.

A torque sensor and a torque detector according to a sixth embodiment of the present disclosure will be described with reference to FIG. 29. A torque detector 161 according to the present embodiment differs from that of the first embodiment in that only one internal power source is provided in the control unit 50. In the present embodiment, the Hall IC 11 and internal power source 56 are coupled by the power supply line 63 and ground line 66, and electric power is supplied from the internal power source 56 to the Hall IC 11. The Hall IC 12 and internal power source 56 are coupled by the power supply line 64 and ground line 67, and electric power is supplied from the internal power source 56 to the Hall IC 12. The output signal TRQ13 corresponding to the torque signal TRQ11 detected by the Hall IC 11 is transmitted to the control unit 50 via the signal line 61. The output signal TRQ23 corresponding to the torque signal TRQ21 detected by the Hall IC 12 is transmitted to the control unit 50 via the signal line 62. The same advantageous effects as the above-mentioned (1) to (10) and (13) to (16) are obtained. The torque sensor 16 of the third embodiment, the torque sensor 17 of the fourth embodiment, or the torque sensor 18 of the fifth embodiment may be used instead of the torque sensor 10.

Seventh Embodiment

Figure 30:
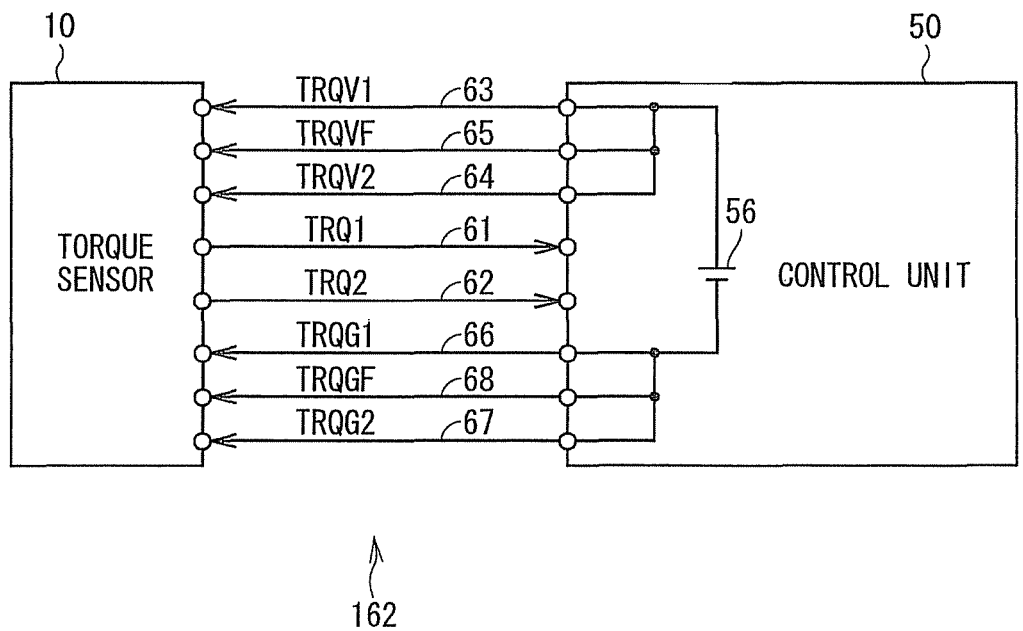
FIG. 30 is a block diagram showing a torque detector according to a seventh embodiment of the present disclosure.
Figure 31:
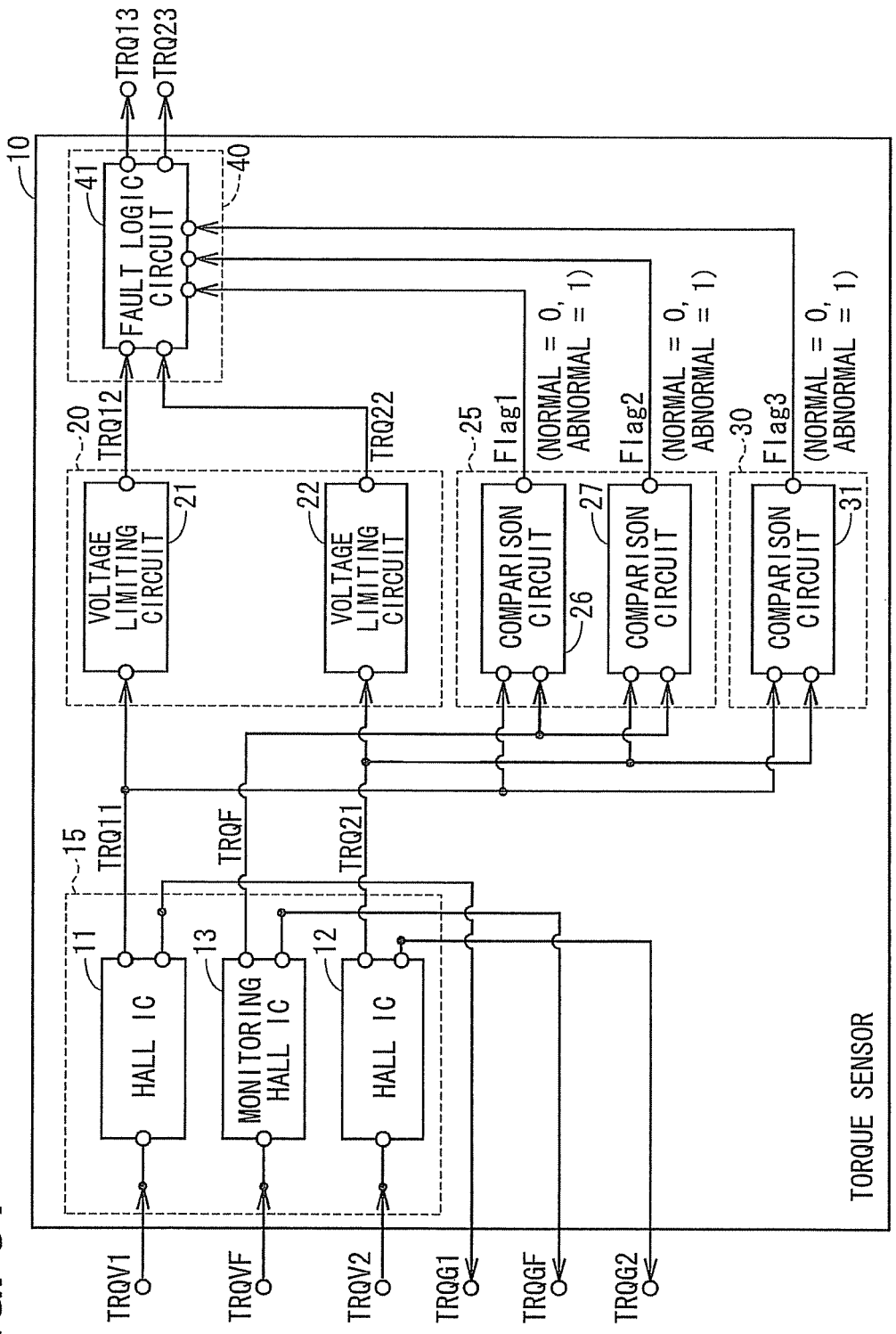
FIG. 31 is a block diagram showing a torque sensor according to the seventh embodiment of the present disclosure.

A torque sensor and a torque detector according to a seventh embodiment of the present disclosure will be described with reference to FIGS. 30 and 31. A torque detector 162 according to the present embodiment differs from that of the sixth embodiment in that the power supply line 65 and ground line 68 are additionally provided to supply electric power to the monitoring Hall IC 13. That is, at least one power supply line 65 and at least one ground line 68 are provided to the monitoring Hall IC 13. As a result, even when abnormality occurs in some of the power supply lines or ground lines, fault detection in the torque sensor 10 can be continued. This provides the same advantageous effects as the above-mentioned (1) to (10) and (13) to (16).

Instead of the torque sensor 10, the torque sensor 16 of the third embodiment, the torque sensor 17 of the fourth embodiment, or the torque sensor 18 of the fifth embodiment may be used. When the torque sensor having multiple monitoring Hall ICs, such as the torque sensors 17 and 18, is used, a power supply line and a ground line may be provided to each monitoring Hall IC.

Eighth Embodiment

Figure 32:
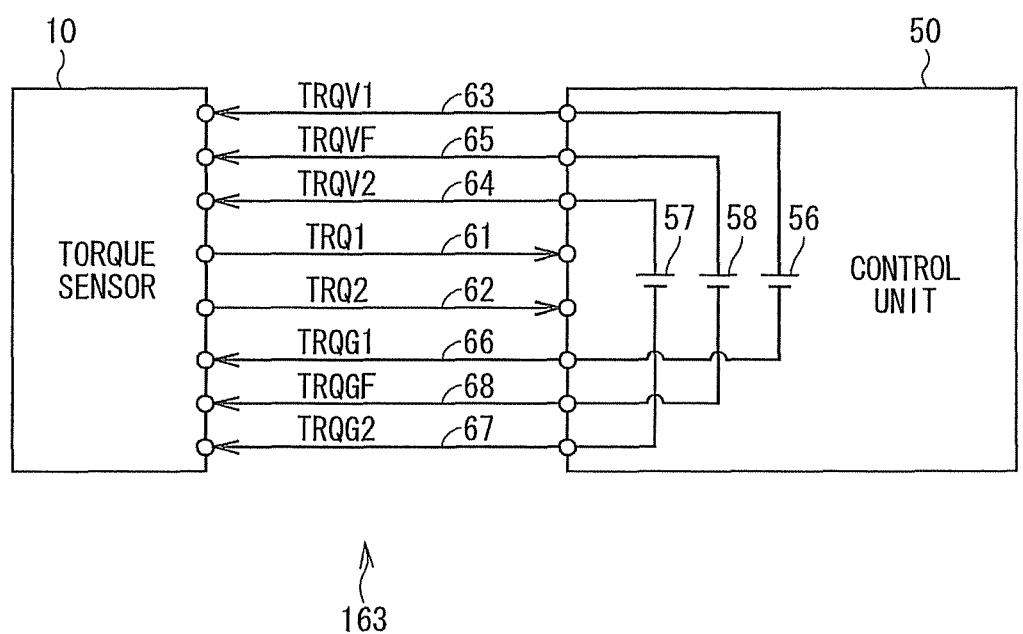
FIG. 32 is a block diagram showing a torque detector according to an eighth embodiment of the present disclosure.

A torque sensor and a torque detector according to an eighth embodiment of the present disclosure will be described with reference to FIG. 32. The torque detector 163 of the present embodiment differs from that of the seventh embodiment in that the internal power sources 56 to 58 are respectively provided to the Hall ICs 11 and 12 and monitoring Hall IC 13. That is, the internal power source 58 is provided to the monitoring Hall IC 13. As a result, even when abnormality occurs in some power supply lines or ground lines, or the internal power source, the fault detection in the torque sensor 10 can be continued. This provides the same advantageous effects as the above-mentioned (1) to (10) and (13) to (16).

Instead of the torque sensor 10, the torque sensor 16 of the third embodiment, the torque sensor 17 of the fourth embodiment, or the torque sensor 18 of the fifth embodiment may be used. When the torque sensor having multiple monitoring Hall ICs, such as the torque sensors 17 and 18, is used, a power supply line, a ground line, and an internal power source may be provided to each monitoring Hall IC.

Other Embodiments

In the above-mentioned embodiments, the Hall IC and the monitoring Hall IC are configured similarly, and the same value is detected in case of normal. In another embodiment, a different value may be detected in each Hall IC or monitoring Hall IC. In a structure in which a different value is detected in the Hall IC or monitoring Hall IC, abnormality can be determined by suitable conversion of detection values inside each circuit, as in the above-mentioned embodiments. In the above-mentioned embodiments, a torque signal is made greater on steering rightward. For example, one Hall IC may have a greater torque signal on steering rightward, and the other Hall IC may have a greater torque signal on steering leftward. The Hall IC and monitoring Hall IC may have different detection sensitivities. In the above-mentioned embodiments, two Hall ICs are provided, but three or greater Hall ICs may be provided. Additionally, three or greater monitoring Hall ICs may be provided. In the above-mentioned embodiments, the torque detector is used in the electric power steering device, but may be used in other devices. As mentioned above, the present disclosure is not limited by the above-mentioned embodiments, and various configurations and modifications are possible without departing from the scope of the invention.

What is claimed is:

1. A torque sensor comprising:
a plurality of torque signal detection sections detecting a torque signal, the torque signal depending on a torque and having a value between a first lower limit and a first upper limit;
at least one monitoring signal detection section detecting a monitoring signal, the monitoring signal being a signal for determining abnormality of the torque signal and having a value between the first lower limit and the first upper limit;
a limiting section changing the torque signal to a second lower limit when the torque signal is equal to or less than the second lower limit that is greater than the first lower limit, the limiting section changing the torque signal to a second upper limit when the torque signal is equal to or greater than the second upper limit that is less than the first upper limit;
an abnormality determination section determining whether abnormality has occurred in the torque signal based on the torque signal and the monitoring signal; and
an output section transmitting an output signal corresponding to the torque signal of each of the torque signal detection sections, wherein
when abnormality has not occurred in the torque signal, the output section transmits, as the output signal, a normal signal that is a value based on the torque signal and is between the second lower limit and the second upper limit, and
when abnormality has occurred in the torque signal, the output section transmits, as the output signal, a first fault notification signal that is a value between the first lower limit and the second lower limit or a second fault notification signal that is a value between the first upper limit and the second upper limit.

2. The torque sensor according to claim 1, further comprising:
   a self-determination section determining whether abnormality has occurred in the torque signal based on a plurality of the torque signals; and
   a monitoring signal abnormality identification section identifying that abnormality has occurred in the monitoring signal when the abnormality determining section determines that abnormality has occurred in the torque signal and when the self-determination section determines that abnormality has not occurred in the torque signal.

3. The torque sensor according to claim 2, wherein
   when abnormality has occurred in the torque signal, the output section transmits one of the first fault notification signal and the second fault notification signal as the output signal, and
   when abnormality has occurred in the monitoring signal, the output section transmits the other of the first fault notification signal and the second fault notification signal as the output signal instead of at least one normal signal.

4. The torque sensor according to claim 2, wherein
   the output section transmits the normal signal as the output signal when the abnormality determination section determines that abnormality has occurred in the torque signal and when the self-determination section determines that abnormality has not occurred in the torque signal, or when the abnormality determination section determines that abnormality has not occurred in the torque signal and when the self-determination section determines that abnormality has occurred in the torque signal.

5. The torque sensor according to claim 2, wherein
   the output section transmits the first fault notification signal or the second fault notification signal as the output signal corresponding to all the torque signal detection sections when the abnormality determination section determines that abnormality has occurred in all the torque signals and when the self-determination section determines that abnormality has occurred in the torque signal.

6. The torque sensor according to claim 1, further comprising a monitoring signal abnormality determination section, wherein
   the at least one monitoring signal detection section includes a plurality of monitoring signal detecting sections, and
   the monitoring signal abnormality determination section determines whether abnormality has occurred in the monitoring signal based on a plurality of the monitoring signals.

7. The torque sensor according to claim 6, further comprising a monitoring signal abnormality location identification section, wherein
   the monitoring signal detection sections are provided to the respective torque signal detection sections,
   the abnormality determination section determines whether abnormality has occurred in the torque signal based on the torque signal detected by each of the torque signal detection sections and the monitoring signal detected by a corresponding one of the monitoring signal detection sections, and
   when the abnormality determination section determines that abnormality has occurred in the torque signal and when the monitoring signal abnormality determination section determines that abnormality has occurred in the monitoring signal, the monitoring signal abnormality location identification section identifies that abnormality has occurred in the monitoring signal detected by the monitoring signal detection section provided corresponding to the torque signal detection section that detects the torque signal determined to be abnormal.

8. The torque sensor according to claim 7, wherein
   when abnormality has occurred in the torque signal, the output section transmits one of the first fault notification signal and the second fault notification signal as the output signal, and
   when abnormality has occurred in the monitoring signal, the output section transmits the other of the first fault notification signal and the second fault notification signal as the output signal corresponding to the torque signal detection section provided corresponding to the monitoring signal detection section that detects the monitoring signal in which abnormality has occurred.

9. The torque sensor according to claim 6, wherein
   the output section transmits the normal signal as the output signal when the abnormality determination section determines that abnormality has not occurred in the torque signal and when the monitoring signal abnormality determination section determines that abnormality has occurred in the monitoring signal.

10. The torque sensor according to claim 6, wherein
    the output section transmits the first fault notification signal or the second fault notification signal as the output signal corresponding to all the torque signal detection sections when the abnormality determination section determines that abnormality has occurred in a plurality of the torque signals.

11. A torque detector comprising:
    the torque sensor according to claims 1;
    a control unit including a signal acquisition section, a fault identification section, and a power circuit section, the signal acquisition section acquiring the output signal transmitted from the output section, the fault identification section identifying a fault based on the signal acquired by the signal acquisition section, the power circuit section supplying electric power to the torque sensor;
    a signal line coupled between the output section and the control unit and transmitting the output signal from the output section to the control unit;
    at least one power supply line coupled between the control unit and the torque sensor; and
    a least one ground line coupled between the control unit and the torque sensor.

12. The torque detector according to claim 11, wherein
    when the output signal acquired by the output signal acquisition section is the first fault notification signal or the second fault notification signal, the fault identification section identifies a fault of the torque signal detection section corresponding to the output signal or a fault of the monitoring signal detection section relating to an abnormality determination of the torque signal corresponding to the output signal.

13. The torque detector according to claim 11, wherein
    when the output signal acquired by the output signal acquisition section is greater than a short fault threshold that is a value greater than the second fault notification signal, the fault identification section identifies a short fault of the power supply line coupled to the torque signal detection section corresponding to the output signal or a disconnection fault of the ground line coupled to the torque signal detection section corresponding to the output signal.

14. The torque detector according to claim 11, wherein
when the output signal acquired by the output signal acquisition section is less than a ground fault threshold that is a value less than the first failure information signal, the fault identification section identifies a disconnection fault of the power supply line coupled to the torque signal detection section corresponding to the output signal or a short fault of the ground line coupled to the torque signal detection section corresponding to the output signal.

15. The torque detector according to claim 11, wherein
the at least one power source line includes a plurality of power source lines, and/or
the at least one ground line includes a plurality of ground lines.

16. The torque detector according to claim 15, wherein
the number of the power supply lines is equal to or greater than the number of the torque signal detection sections, and the number of ground lines is equal to or greater than the number of the torque signal detection sections, and
each of the torque signal detection sections is coupled with at least one of the power supply lines and at least one of the ground lines.

17. The torque detector according to claim 16, wherein
the power circuit section is provided to each of the torque signal detection sections.

18. The torque detector according to claim 16, wherein
the monitoring signal detection section is coupled with a plurality of the power supply lines and a plurality of the ground lines provided to a plurality of the torque signal detection sections.

19. The torque detector according to claim 16, wherein
the monitoring signal detection section is coupled with at least one of the power supply lines and at least one of the ground lines.

20. The torque detector according to claim 19, wherein
the power circuit section is provided to the monitoring signal detection section.

21. An electric power steering device comprising the torque detector according to claims 11, wherein
the control unit further includes a calculation section that calculates an amount of assist for reducing steering torque based on the signal acquired by the output signal acquisition section.

22. The electric power steering device according to claim 21, wherein
the calculation section calculates the amount of assist based on the output signal which is the normal signal.

23. The electric power steering device according to claim 21, wherein
the control unit includes a stop section that stops assistance processing for reducing steering torque when the signal acquisition section does not acquire the output signal which is the normal signal.

24. The electric power steering device according to claim 21, wherein
the control unit includes a notification section that notifies a driver of occurrence of abnormality in the torque detector when the output signal having a value without a range from the second lower limit to the second upper limit is acquired by the output signal acquisition section.

\* \* \* \* \*